United States Patent
Cassidy et al.

(10) Patent No.: US 12,400,109 B2
(45) Date of Patent: Aug. 26, 2025

(54) FUNCTIONAL SYNTHESIS OF NETWORKS OF NEUROSYNAPTIC CORES ON NEUROMORPHIC SUBSTRATES

(71) Applicant: INTERNATIONAL BUSINESS MACHINES CORPORATION, Armonk, NY (US)

(72) Inventors: Andrew S. Cassidy, San Jose, CA (US); Pallab Datta, San Jose, CA (US); Myron D. Flickner, San Jose, CA (US); Dharmendra S. Modha, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1373 days.

(21) Appl. No.: 15/884,105

(22) Filed: Jan. 30, 2018

(65) Prior Publication Data

US 2019/0236444 A1    Aug. 1, 2019

(51) Int. Cl.
- *G06N 3/065* (2023.01)
- *G06N 3/044* (2023.01)
- *G06N 3/049* (2023.01)
- *G06N 3/08* (2023.01)

(52) U.S. Cl.
CPC ............ *G06N 3/065* (2023.01); *G06N 3/044* (2023.01); *G06N 3/049* (2013.01); *G06N 3/08* (2013.01)

(58) Field of Classification Search
CPC .... G06N 3/0635; G06N 3/0445; G06N 3/049; G06N 3/08; G06N 3/105; G06N 3/063
See application file for complete search history.

(56) References Cited

U.S. PATENT DOCUMENTS

| | | | |
|---|---|---|---|
| 9,015,096 B2* | 4/2015 | Hunzinger | G06N 3/049 706/45 |
| 9,275,328 B1* | 3/2016 | Minkovich | G06N 3/088 |
| 10,248,675 B2* | 4/2019 | Birdwell | G06N 3/0635 |
| 10,354,183 B2 | 7/2019 | Alpert et al. | |
| 10,552,740 B2 | 2/2020 | Alpert et al. | |
| 2016/0132767 A1* | 5/2016 | Alpert | G06N 3/049 706/29 |

OTHER PUBLICATIONS

"Sawada, (TrueNorth Ecosystem for Brain-Inspired Computing: Scalable Systems, Software, and Applications), Nov. 2016" (Year: 2016).*

(Continued)

*Primary Examiner* — Michelle T Bechtold
*Assistant Examiner* — Robert Bejcek, II
(74) *Attorney, Agent, or Firm* — Erik A. Huestis; Katherine L. Baker; Foley Hoag LLP

(57) ABSTRACT

Neurosynaptic core placement is provided. In various embodiments, a description of a neural network is read. The neural network comprises a plurality of nodes. For each one of the plurality of nodes, a graph is generated corresponding to the nodes incident on that one of the plurality of nodes within the neural network. For each one of the plurality of nodes, a bin is selected from a plurality of bins for placement of the one of the plurality of nodes. A placement description is output for the plurality of nodes to the plurality of bins.

11 Claims, 26 Drawing Sheets

(56) References Cited

OTHER PUBLICATIONS

"Ji, (NEUTRAMS: Neural Network Transformation and Co-design under Neuromorphic Hardware Constraints), Oct. 2016" (Year: 2016).*

Esser et al. Convolutional networks for fast, energy-efficient neuromorphic computing. PNAS | Oct. 11, 2016 | vol. 113 | No. 41 (Year: 2016).*

Galluppi et al. A Hierachical Configuration System for a Massively Parallel Neural Hardware Platform. CF'12, May 15-17, 2012, Cagliari, Italy (Year: 2012).*

Esser et al. "Convolutional networks for fast, energy-efficient neuromorphic computing." Proceedings of the National Academy of Sciences of the United States of America; Oct. 11, 2016; 1139410: 11441-11446.

* cited by examiner

FUNCTIONAL SYNTHESIS OF NETWORKS OF NEUROSYNAPTIC CORES ON NEUROMORPHIC SUBSTRATES

This invention was made with Government support under contract no. B613893 awarded by the Defense Advanced Research Projects Agency (DARPA). The Government has certain rights to this invention.

BACKGROUND

Embodiments of the present invention relate to neurosynaptic core placement, and more specifically, to functional synthesis of networks of neurosynaptic cores on neuromorphic substrates.

BRIEF SUMMARY

According to embodiment of the present disclosure, methods of and computer program product for neurosynaptic core placement are provided. In various embodiments, a description of a neural network is read. The neural network comprises a plurality of nodes. For each one of the plurality of nodes, a graph is generated corresponding to the nodes incident on that one of the plurality of nodes within the neural network. For each one of the plurality of nodes, a bin is selected from a plurality of bins for placement of the one of the plurality of nodes. A placement description is output for the plurality of nodes to the plurality of bins.

DETAILED DESCRIPTION

Figure 1:
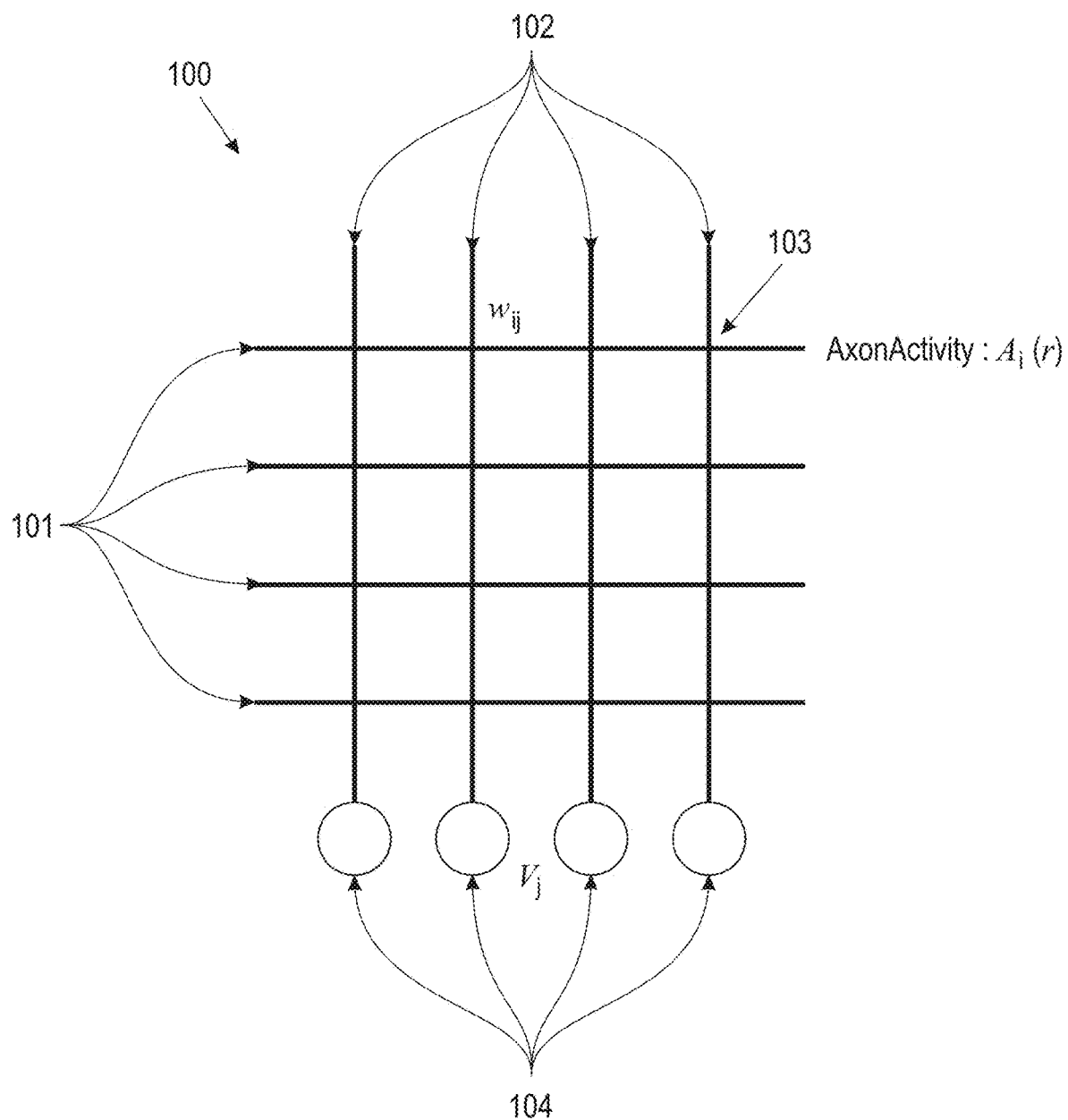
FIG. 1 depicts a neurosynaptic core according to embodiments of the present disclosure.

Arrays of extremely low power neurosynaptic processing units, called neurosynaptic cores, provide an architecture to solve exascale big data problems. These cores use spikes to encode information. In a network of neurosynaptic cores, neurons on each core can connect to any axon of any other neurosynaptic core (including itself). When a neuron spikes, it sends a spike packet that gets delivered to a target axon on a destination core.

In digital spiking neuromorphic systems, information is represented and delivered by spikes, where each spike is a digital packet of information, carrying one or more bits. For example, the IBM® TrueNorth chip is a digital spiking neuromorphic system where each spike carries a single bit of information (a binary spike). Spiking neural networks such as TrueNorth are based on delivering packets of information over switched communication wires, thereby significantly reducing the required wiring. The presence of a spike is treated as receiving a 1, its absence represents a 0. More values can be coded into binary spikes using several different spike coding schemas.

A spike communication from a source neuron on a source core, to a target axon on a destination core, would effectively need to traverse certain number of hops via routers in a 2D grid in either the horizontal or vertical or a combination of both to be delivered to the target axon on a destination core. Each hop a spike packet traverses, consumes power and energy.

Within an exemplary neuromorphic system such as TrueNorth, a fixed amount of time is allowed for a spike to travel from its source neuron to its destination axon. This fixed window is referred to as a tick. The time a spike requires for its journey varies based on the distance the spike must travel and the number of 2-D mesh routing, chip and board interfaces that the spike travels across.

On each tick, the neurons in a core are processed sequentially, starting with the first neuron and continuing through the last neuron. Accordingly, in addition to the transmission delays discussed above, each spike is also delayed by some additional fixed amount based on which neuron on a core generated it. For example, in an exemplary neuromorphic system such as TrueNorth having 256 neurons per core, the 256th neuron is not processed until the preceding 255 neurons are processed.

According to various embodiments of the present disclosure, a neurosynaptic program represents a neurosynaptic network. A neurosynaptic program includes information relating to the neurosynaptic network. In some embodiments, the information includes neuronal properties and dynamics that determine an electronic neuron's response to input spikes. For example, neuronal properties and dynamics can include a threshold parameter, a leak parameter, a delay parameter, or a reset parameter. In some embodiments, the neurosynaptic program information includes synaptic connections of the neuron (e.g., synaptic connections made via a synaptic crossbar). In some embodiments, the neurosynaptic program information includes axon properties (e.g., axon types). In some embodiments, the neurosynaptic program information includes one or more destinations (e.g., target axons) that the neuron's output spike should be delivered to.

According to various embodiments, a neurosynaptic network represents an instantiation of a neurosynaptic program.

A neurosynaptic network may be instantiated in hardware, in simulation or in both. For example, a neurosynaptic program may give rise to one or more instances of a neurosynaptic network, wherein the instances may reside on a single core, multiple cores, or multiple chips.

According to various embodiments, a neuromorphic core circuit represents an example neurosynaptic network described by a neurosynaptic program.

According to various embodiments, a corelet or a Corelet Programming Language represent software that provide abstraction of neurosynaptic programs. A composition of neurosynaptic programs may be created by composing corelets.

A TrueNorth program is a complete specification of a network of neurosynaptic cores, along with its external inputs and outputs. In various embodiments, a divide-and-conquer approach is adopted whereby a large network of neurosynaptic cores is constructed by interconnecting a set of smaller networks of neurosynaptic cores, where each of the smaller networks, in turn, could be constructed by interconnecting a set of even smaller networks, and so on, down to a network consisting of a single neurosynaptic core, which is the fundamental non-divisible building block. This programming paradigm is referred to as Corelet Programming.

The present disclosure provides for efficiently mapping an abstract (logical) network of neurosynaptic cores (for example, a Corelet) to an array of physical neurosynaptic cores (for example, the TrueNorth chip). Efficiency corresponds to minimizing the overall active power of the system as well as minimizing the spike bandwidth between multiple chips.

In various embodiments, trained networks in the MatConvNet or Caffe framework are converted into corelets using the Corelet programming Language (CPL). The Corelet programming paradigm permits construction of complex applications and cognitive algorithms while being efficient for TrueNorth and effective for programmer productivity.

As described above, a Corelet is an abstraction of a TrueNorth program and is composed hierarchically from sub-corelets (other corelets) while ensuring correctness, consistency, and completeness with respect to the TrueNorth architecture. Corelet Programming Language (CPL) is a compositional language that enables rapid development of very large scale neurosynaptic systems, e.g., those trained via MatConvNet or Caffe.

Creating, composing, and specifying large networks, built of various components concurrently performing different tasks, is a challenging task. The Corelet Programming Language is a composition language that enables programmers to quickly create large networks of neurosynaptic cores. Programs created in CPE (Corelet Programming Environment) and simulated using Compass (NSCS) run in 1:1 compliance with the neuromorphic substrate in question. TrueNorth is one embodiment of such a neuromorphic hardware. The Corelet programmer is agnostic of the physical location of the network of neurosynaptic cores on the actual physical hardware. However, every core in the network of neurosynaptic cores need to be mapped to a unique physical (X, Y) location on the neuromorphic architecture, e.g., the TrueNorth chip.

With reference now to FIG. 1, a neurosynaptic core according to embodiments of the present disclosure is depicted. In some embodiments, neurosynaptic core 100 includes axons 101, represented as rows, dendrites 102, represented as columns, synapses 103, represented as row-column junctions, and neurons 104 that receive inputs from dendrites. In some embodiments, there are 256 axons, and 256 neurons. In such embodiments, there are 256×256=65, 536 synapses. Information flows from axons 101 to the neurons 104, modulated by the synapses 103. In various embodiments, the synapses may be binary, and may be associated with synaptic weights.

Figure 2:
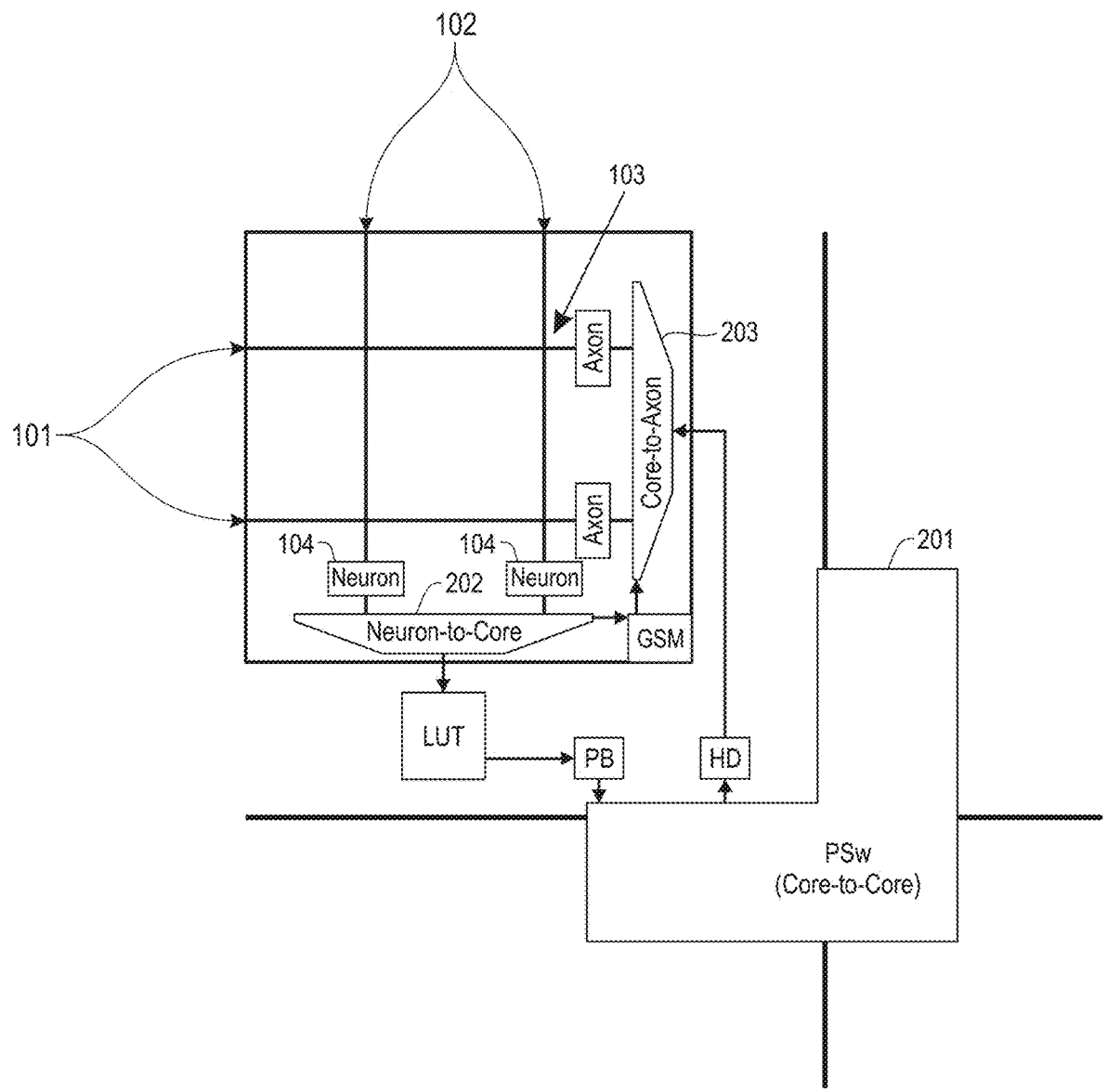
FIG. 2 depicts a neurosynaptic core and mesh router according to embodiments of the present disclosure.

In some embodiments a plurality of neurosynaptic cores are tiled on a chip. In an exemplary embodiment, a 64 by 64 grid of cores is tiled, yielding 4,096 cores, for a total of 1,048,576 neurons and 268,435,456 synapses. In such embodiments, neurons, synapses, and short-distance connectivity are implemented by the core circuit. Long-distance connectivity is logical. An exemplary embodiment is depicted in FIG. 2. Mesh router 201 provides communication between cores. Also on a given core, neuron to core 202 and core to axon 203 communication links are provided.

Figure 3:
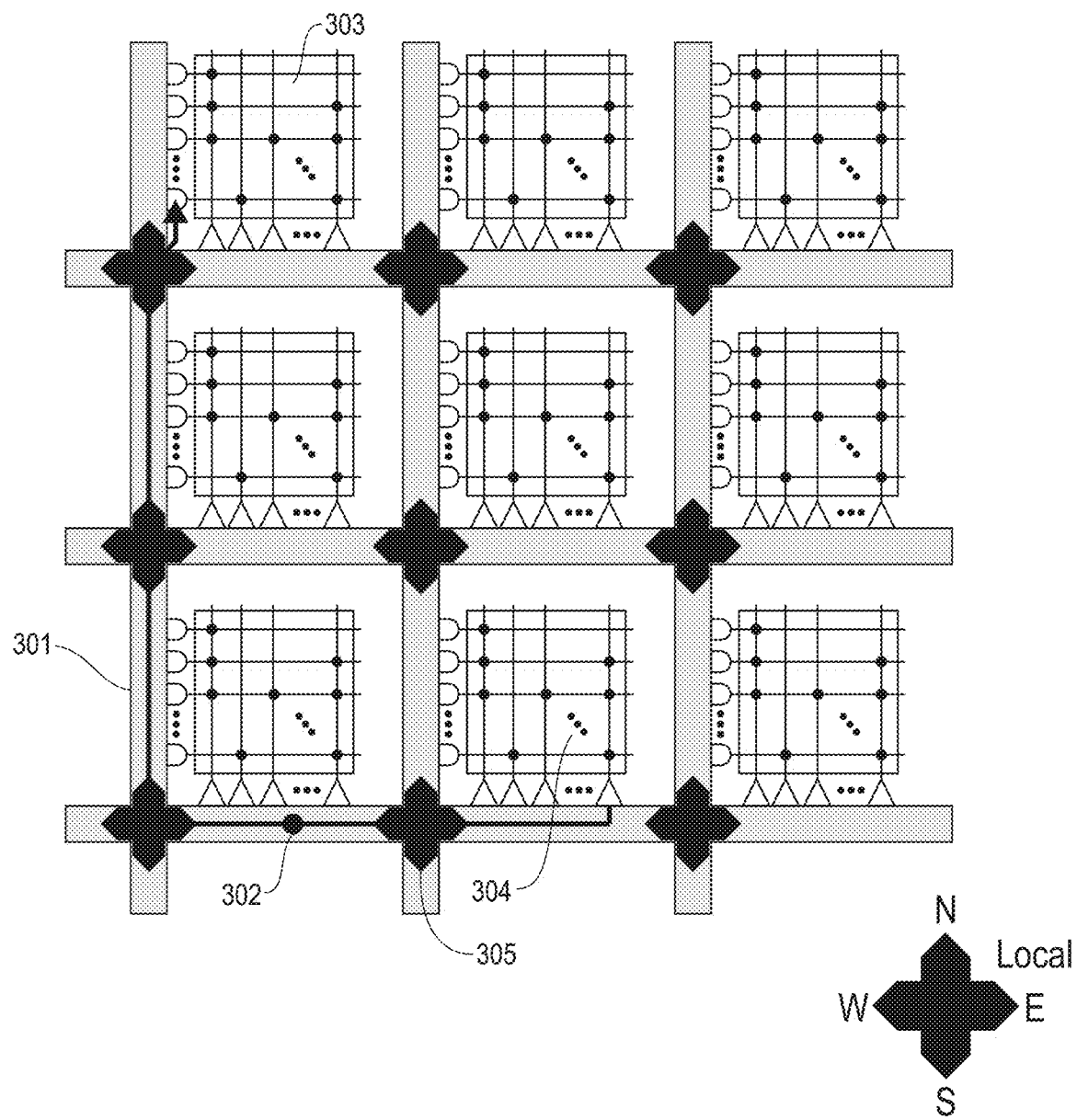
FIGS. 3-4 illustrate exemplary routing within an exemplary neurosynaptic system.
Figure 4:
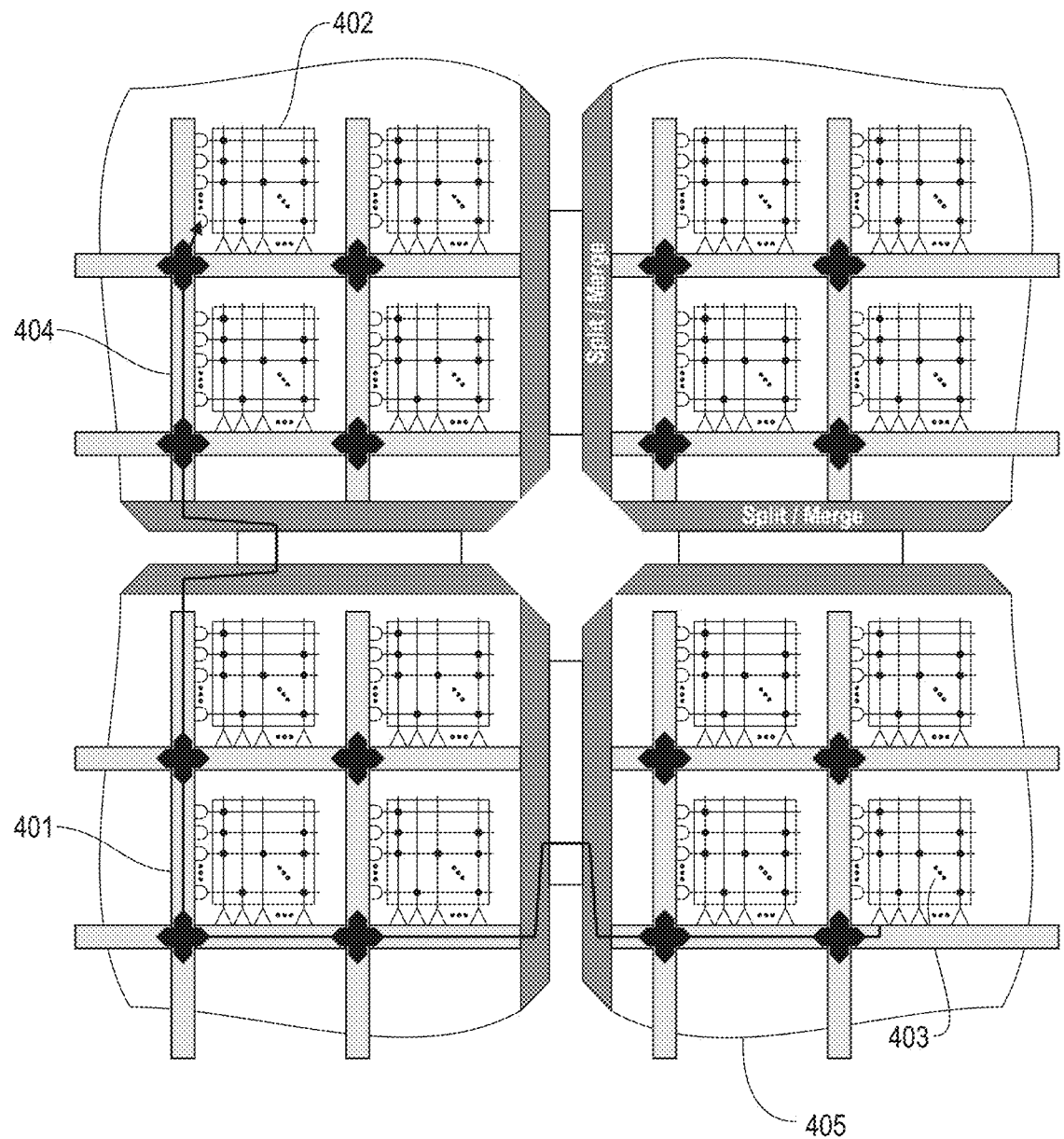

With reference now to FIGS. 3-4, routing within an exemplary neurosynaptic system is illustrated. In FIG. 3, a route 301 for spike 302 passes between cores 303 . . . 304 on the same chip via on-chip packet routers 305. In FIG. 4, a route 401 passes between cores 402 . . . 403 on different chips 404 . . . 405. The energy to route a spike between two cores is a function of the Manhattan distance (path along grid lines) between the grid locations of the two cores.

FIGS. 3-4, exemplify routing between cores on a neurosynaptic chip such as provided in TrueNorth and between cores on different neurosynaptic chips. Neurosynaptic systems such as TrueNorth use a deterministic dimension-order router, in which spikes first travel horizontally (east-west) and then vertically (north-south) between their source and destination. In some embodiments, this path cannot be configured. The active power required to route a spike between two cores is a function of the Manhattan distance between the grid locations of the two cores. The power becomes much higher if the spikes traverse the chip boundaries and flow between different chips. Accordingly, the objective of placement optimization is to minimize the overall active power of the system. In addition, placement optimization may also minimize the spike bandwidth between multiple chips. In some embodiments, placement is performed by Neuro Synaptic Core Placement (NSCP) optimization software. By using such tools, bandwidth and energy are conserved. NSCP may also perform the physical mapping of cores under the constraints of a few bad cores which may exist in any chip due to manufacturing defects.

Figure 5:
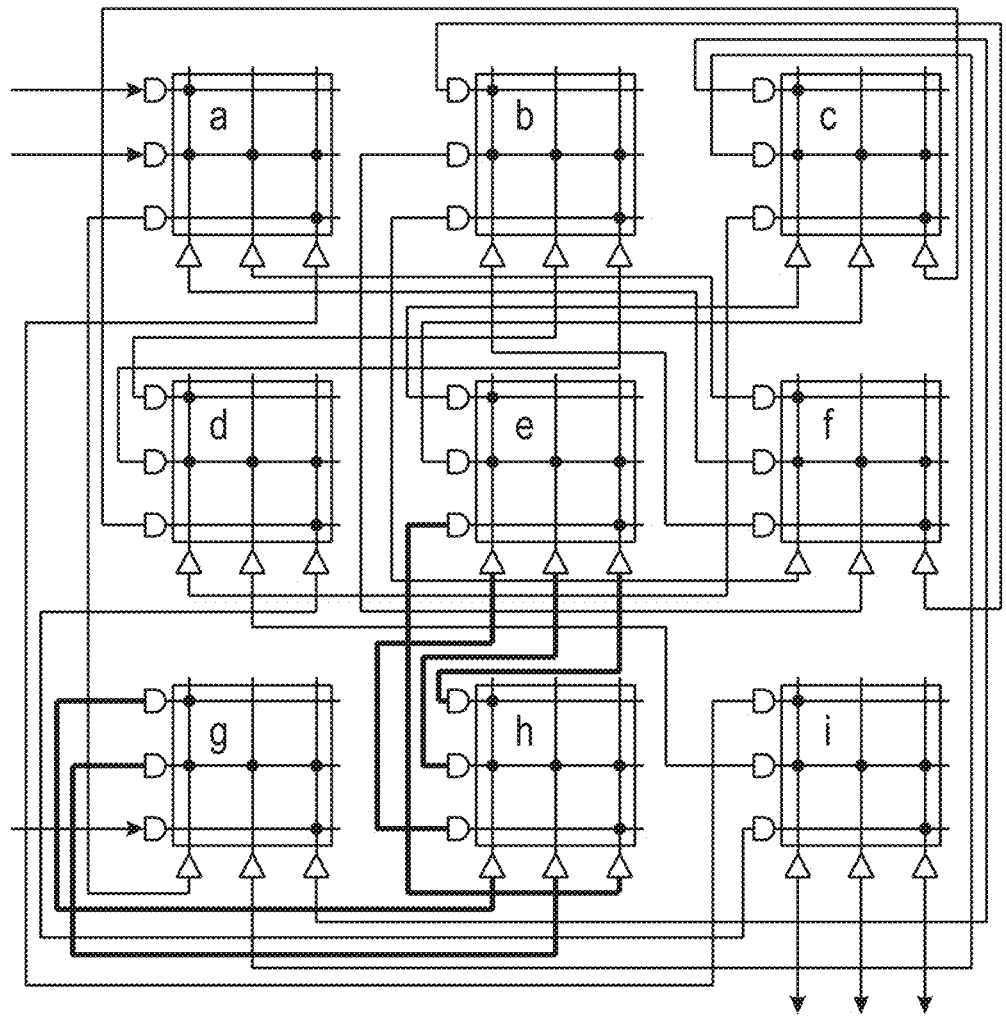
FIGS. 5-6 illustrate the hop count between exemplary cores within an exemplary neurosynaptic system.
Figure 6:
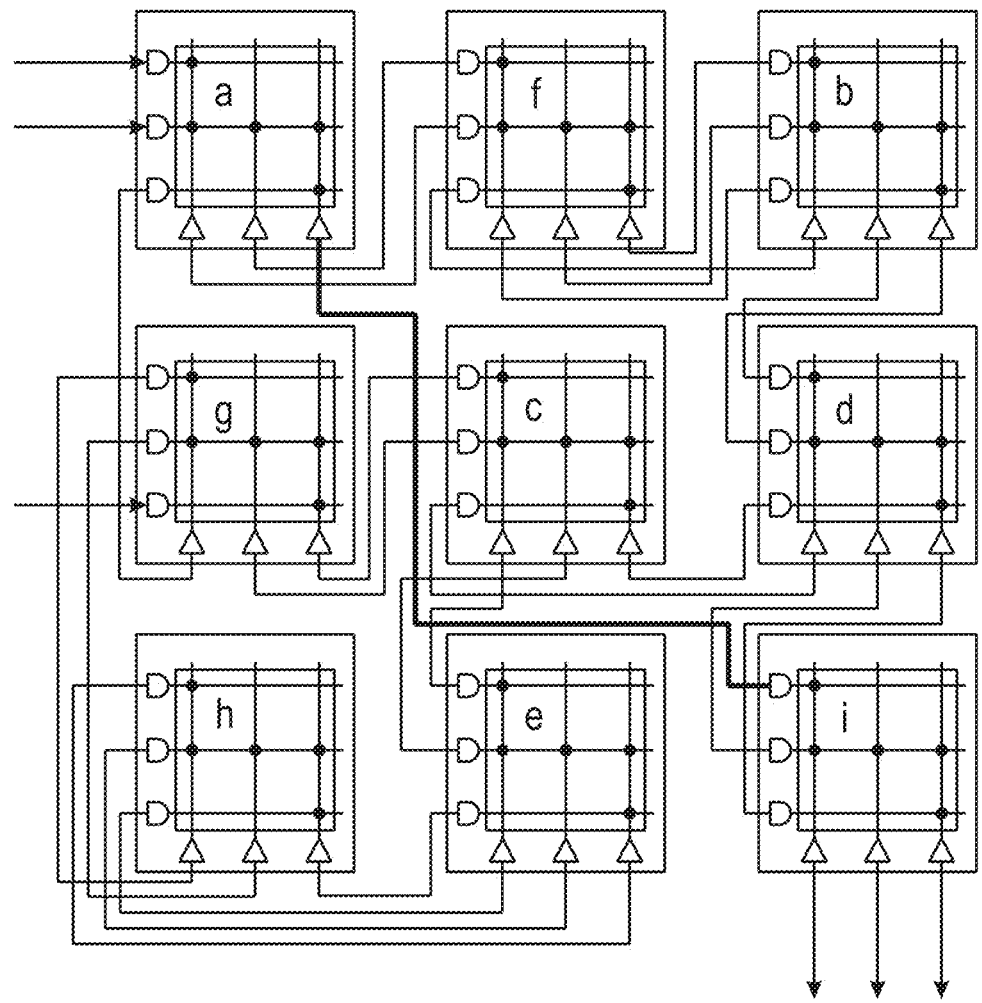

With reference now to FIGS. 5-6, the number of hops between cores are illustrated with regard to two exemplary core layouts. In this example, FIG. 5 has a higher total hop distance. In each example, cores a-i are arranged with darker lines indicating longer hops, and lighter lines indicating single hops. Placement according to the present disclosure optimizes the core placement to minimize the average path length (or hops) by placing cores to shorten the path.

Figure 7:
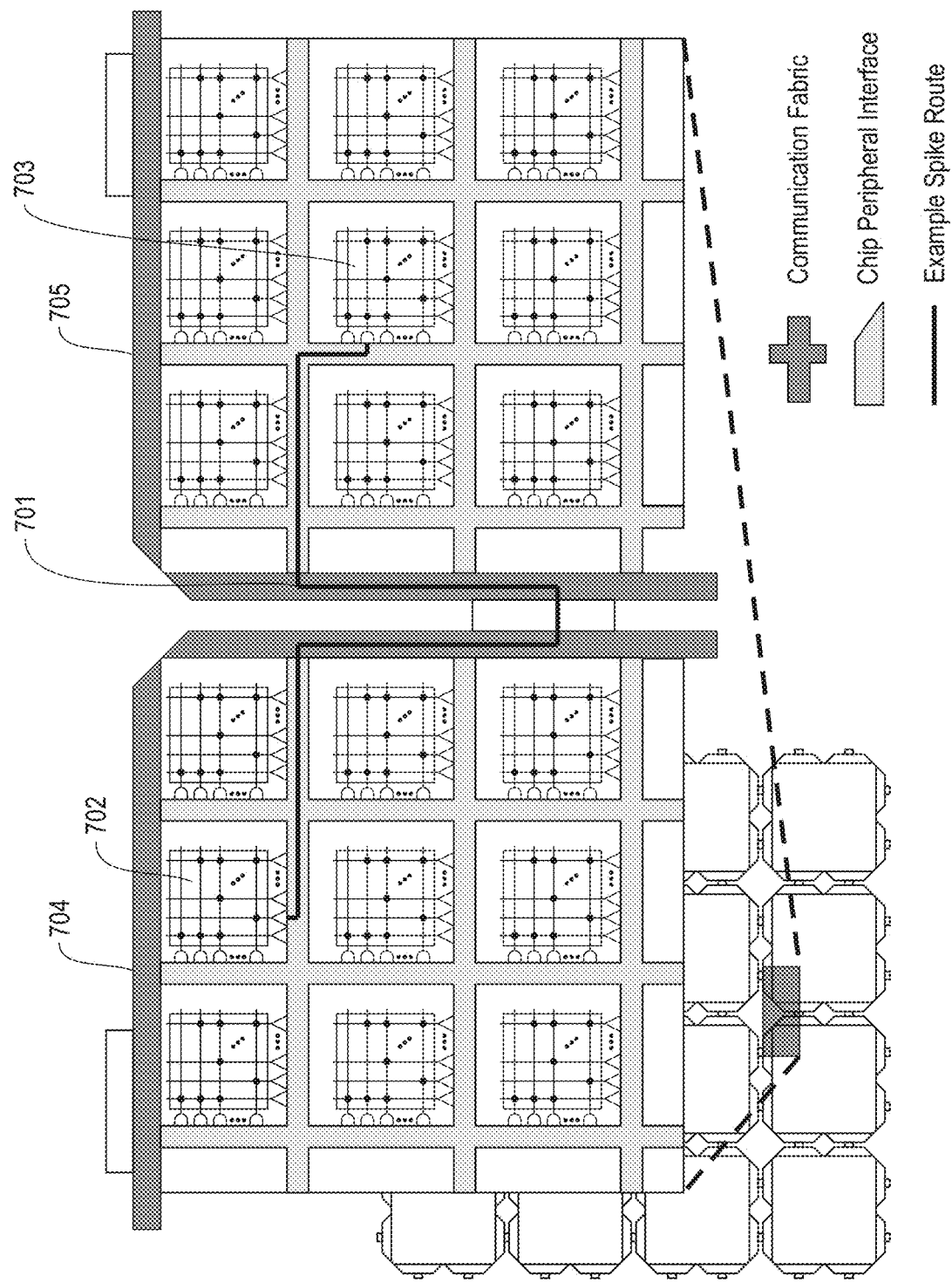
FIG. 7 illustrates an exemplary route across chip boundaries within an exemplary neurosynaptic system.

With reference now to FIG. 7, an exemplary route across chip boundaries is illustrated. Route 701 passes between cores 702 . . . 703 on different chips 704 . . . 705 via the communication fabric and across the chip peripheral interface. The energy to route a spike between two cores is a function of the Manhattan distance (path along grid lines) between the grid locations of the two cores. The energy requirement is two orders of magnitude larger for hops between chips than it is for hops within a chip. The energy and bandwidth costs used for placement optimization are summarized in Equation 1-Equation 3.

$$E_{active} \propto \text{distance}(C_{src}(x,y), C_{dest}(x,y)) \qquad \text{Equation 1}$$

$$E_{inter-chip} \approx 225 \times E_{intra-chip} \qquad \text{Equation 2}$$

$$BW_{inter\text{-}chip} < 320 \times BW_{intra\text{-}chip} \qquad \text{Equation 3}$$

The objective function for placement is to minimize the inter-chip communication and hence the active power of the overall neurosynaptic system. In order to do so, placement algorithms according to various embodiments maximize the number of paths that are contained within one chip while minimizing the number of paths that require inter-chip hops. The placement objective function may be summarized as minimization of $E_{active}$(communication).

According to various embodiments of the present disclosure, NSCP (Neuro Synaptic Core Placer) is an optimization tool that can be used for single-chip systems (such as NS1e) as well as on multi-chip systems (such as NS16e) because the power per hop for across chip transitions is significantly higher than as compared to a single hop energy within chip. Also in the case of multi-chip neurosynaptic systems, the networks should be optimized so that the bandwidth between the chips isn't saturated.

In some embodiments, NSCP takes a model file and produces a map between the abstract network of neurosynaptic cores built by the Corelet Programming Environment (CPE) to the physical indices on a chip and/or a board of TrueNorth chips. It also takes into account constraints of target boards, e.g., the NS16e board, such as external I/O port bandwidth and the bandwidth on the funnels in the E/W/N/S direction at the peripherals of each TrueNorth chip.

Placement algorithms according to the present disclosure leverage the structure of the neurosynaptic network for mapping onto the physical chips. Many cognitive neurosynaptic applications that are built using neurosynaptic cores have a topographic structure in their connectivity across cores. Deep Learning has become extremely popular recently and has shown success in achieving state of the art or better than human level performance in many object recognition, pattern recognition and classification tasks. It has become widely applicable in a broad class of applications such as image, audio, video, text, music, and language modeling. In these application domains the input signal may generally be considered as an N-dimensional tensor of data that needs to be processed by the neurosynaptic system.

For an equitable distribution of input spikes onto each chip, even distribution of all the K input cores receiving input from the external world is desirable. Supposing there are m chips to layout the overall network, the optimal partitioning problem is to place the K cores into m sets such that the overall network can be laid out efficiently on the m chips.

Figure 8:
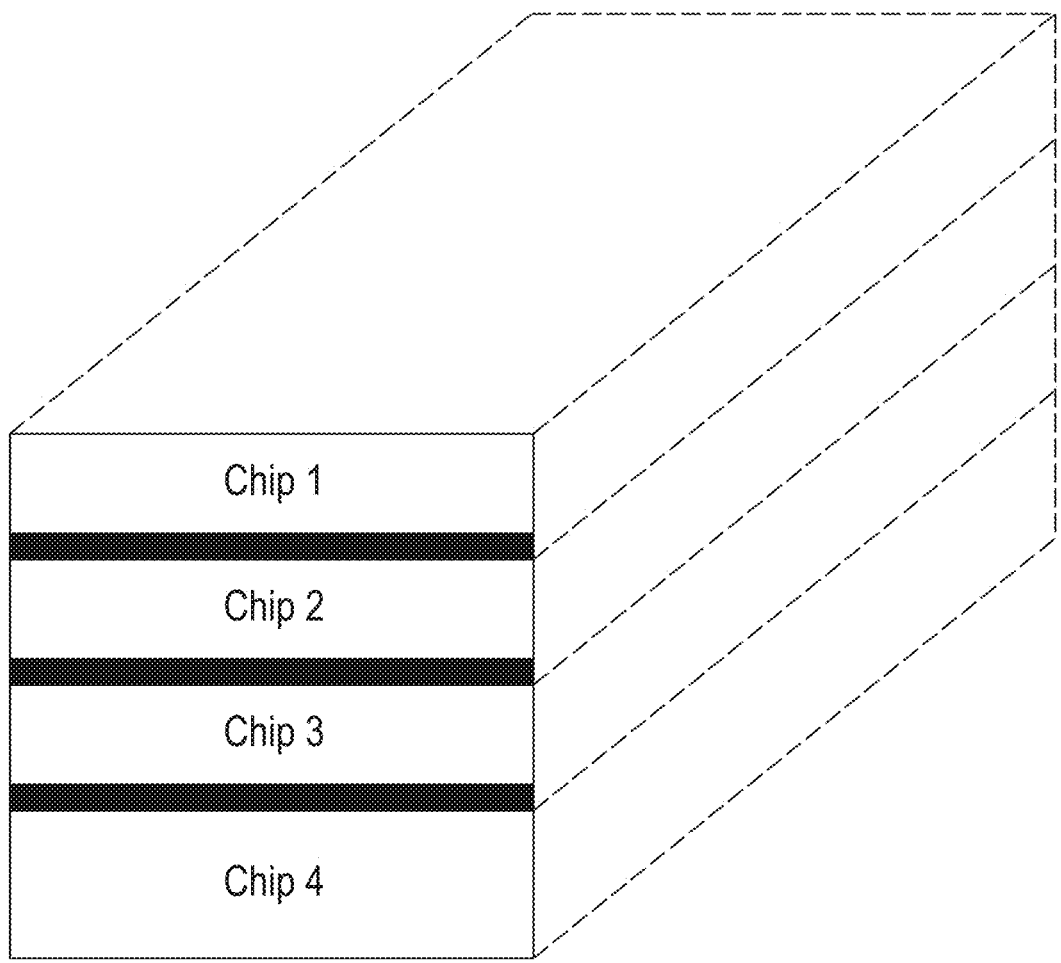
FIGS. 8-9 illustrate exemplary chip layouts within an exemplary neurosynaptic system.
Figure 9:
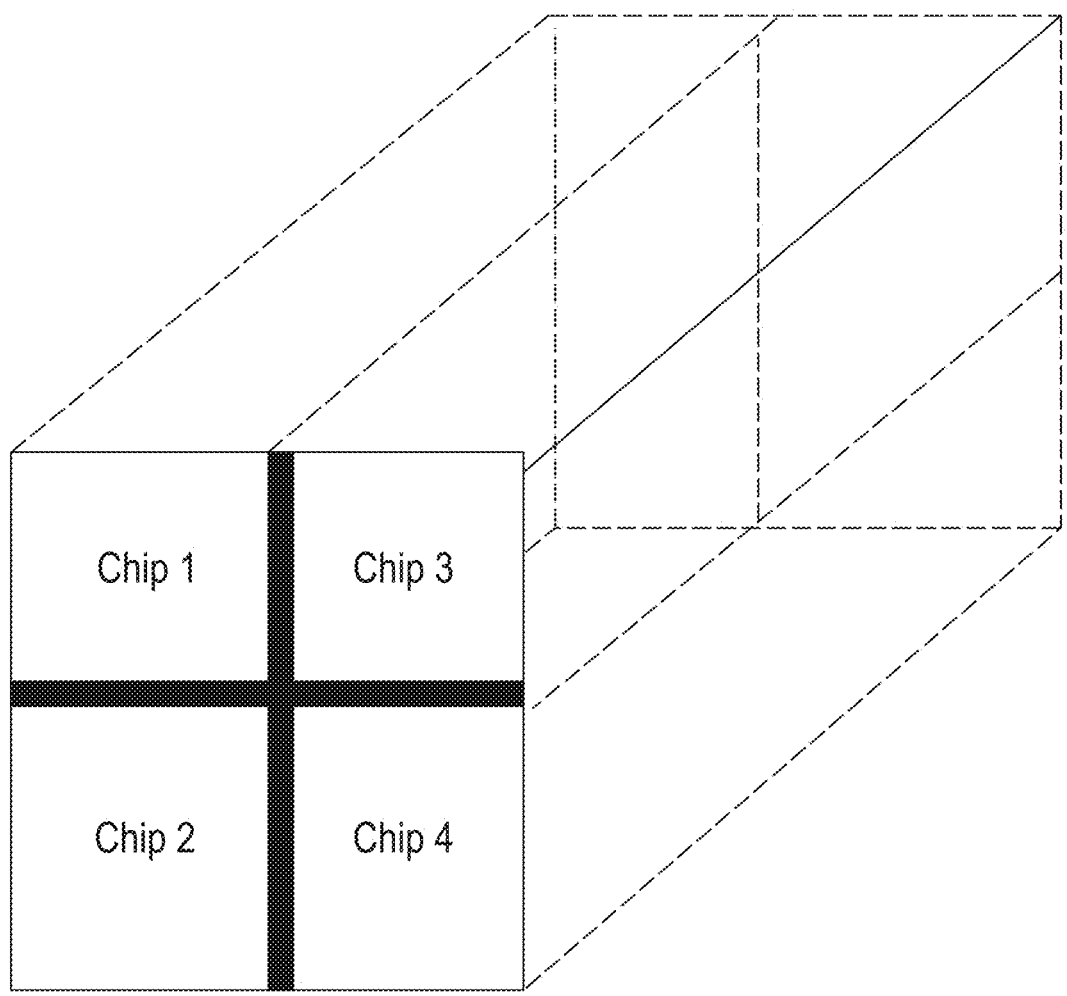

Referring now to FIGS. 8-9, exemplary chip layouts are illustrated. In these examples, assume an input signal having dimension 32×32×6 to be routed onto input cores which will then be placed on chips. In this example, four chips are available for placement. Thus, to split the input signal into four partitions, there are at least two choices, as shown in FIGS. 8-9.

In the case of FIG. 8, there are three edge transitions, where the cores receiving input at the edges of the input signal would cause cross chip spikes. Hence there are three such edge transitions if we cut the input signal into four planes as shown.

As shown in FIG. 9, if the input signal is cut into four quadrants, the intersection boundary is reduced to two edge sharing between adjacent chips. Hence this provides a more optimal way of splitting the input signal across four chips.

FIGS. 8-9 illustrate two ways in which the input signals can be split across four chips. Both of the partitions generate equal sized regions with rectangular facets. However, FIG. 8 shows three partitioning planes of sizes 32×6 over the whole signal space with total area 3×32×6. In comparison, the total area of partitioning planes can be minimized to 2×32×6 as shown in FIG. 9, which effectively minimizes the communication across chips and hence aids placement. Similarly, there are several such competing configurations of signal partitioning depending on the number of chips that the overall network is laid out on.

If all of the cores of the neurosynaptic system that correspond to the first layer of a deep learning network are placed on one chip, then the following layer cores must be placed on another chip. If the neurosynaptic system is a truly feed-forward network, then all of the communication from layer 1 would propagate to layer 2. In this case, all communications between layer 1 and layer 2 would need to traverse chip boundaries, which is not efficient in terms of the spike bandwidth between chips and active energy. Accordingly, heuristic placement methods provided herein partition the input signal evenly across K bins (where K is the total number of chips needed to place the neurosynaptic system).

Figure 10:
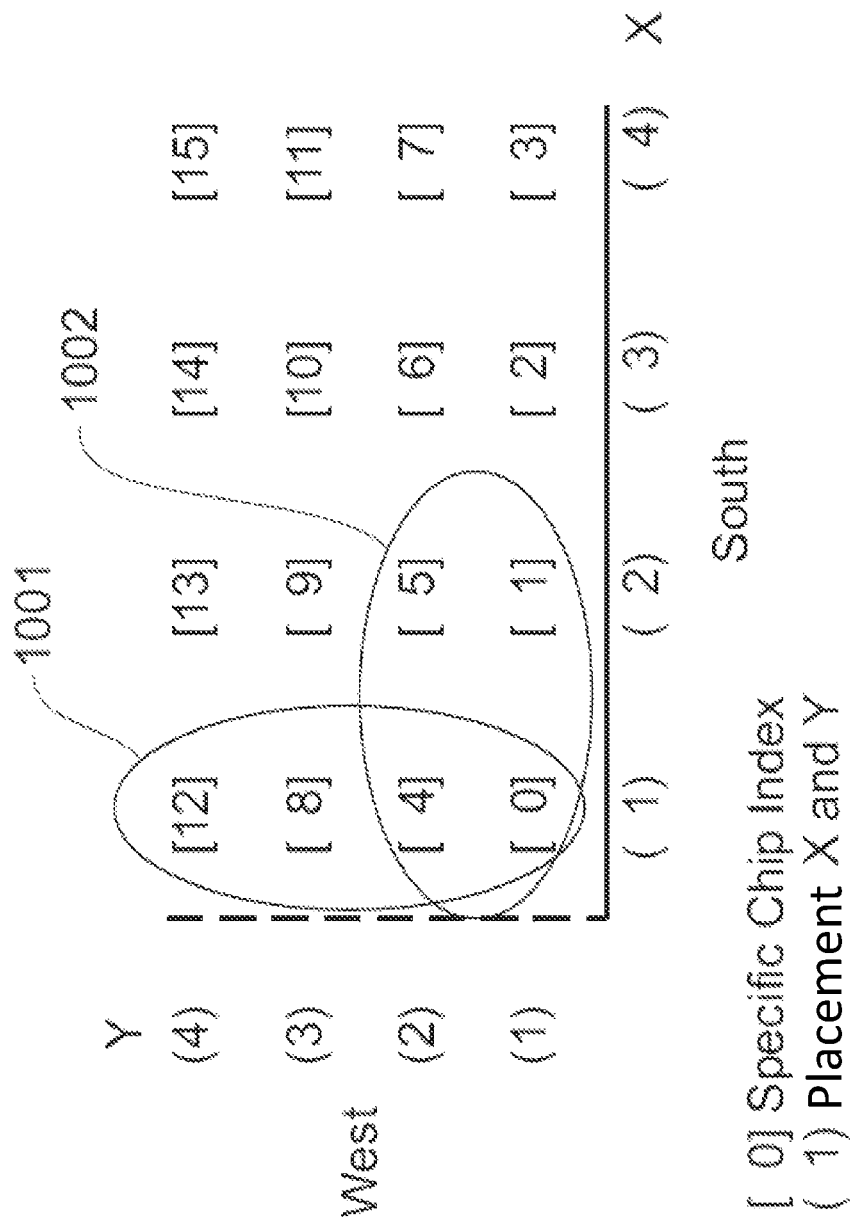
FIG. 10 illustrates an exemplary layout tool according to embodiments of the present disclosure.

Referring now to FIG. 10, an exemplary layout tool is illustrated according to embodiments of the present disclosure. In this example, chip IDs 0-15 are provided in a X, Y grid. In various embodiments, depending on the configuration of the chips that are chosen by the user for the neurosynaptic system layout, placement should determine the mapping between the input signal space and those chips such that the arrangement is optimal. In various embodiments, a user may specify a layout configuration by indicating either a set of specific chips (by setting a useSpecifiedChips flag, for example) or by indicating X, Y dimensions of the chips to be used for layout. For example, where useSpecifiedChips=false and the placement dimensions are 1, 4, the chips in area 1001 would be used for layout. Similarly, where useSpecifiedChips=false and the placement dimensions are 2, 2, the chips in area 1002 would be used for layout.

In this example, if useSpecificChips=false and the layout is defined by X and Y dimensions between 1 and 4, then there are only a finite set of possible configurations that can be laid out on the board. Depending on the size of the neurosynaptic network, users can appropriately choose different X, Y dimensions to place the network on the multi-chip neurosynaptic system. For example, if the size of the neurosynaptic system is 4 chips, users can either choose X, Y dimensions of 1, 4; 4, 1; or 2, 2. Each would lead to a different placement solution and any one may be more optimal for a given network based on the constraints of input and output spikes of the neurosynaptic system.

Figure 11:
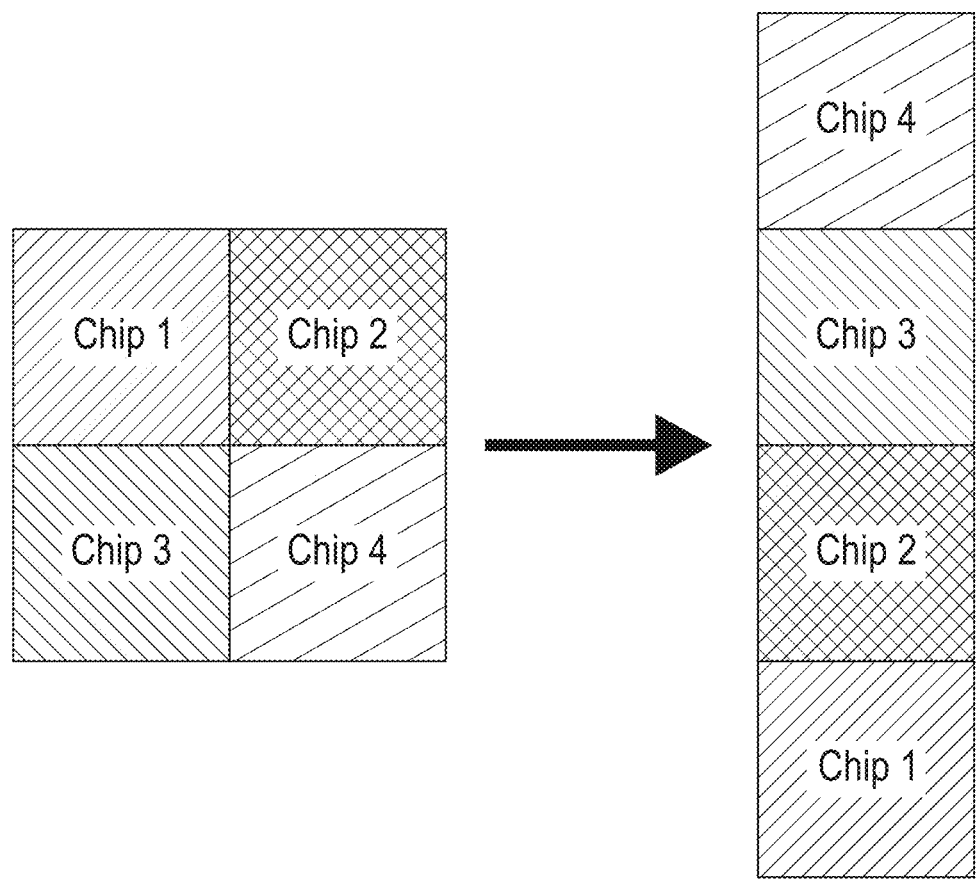
FIGS. 11-14 illustrate mappings between an input signal space and individual neurosynaptic chips within an exemplary neurosynaptic system.
Figure 12:
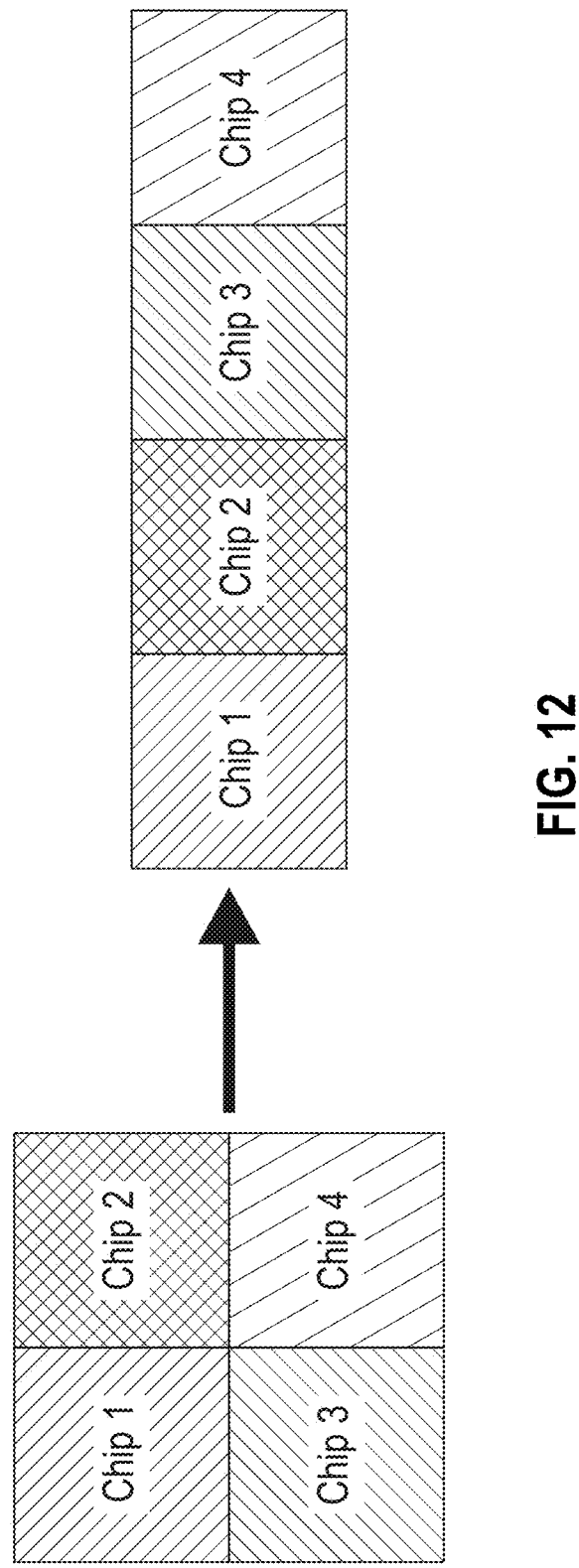
Figure 13:
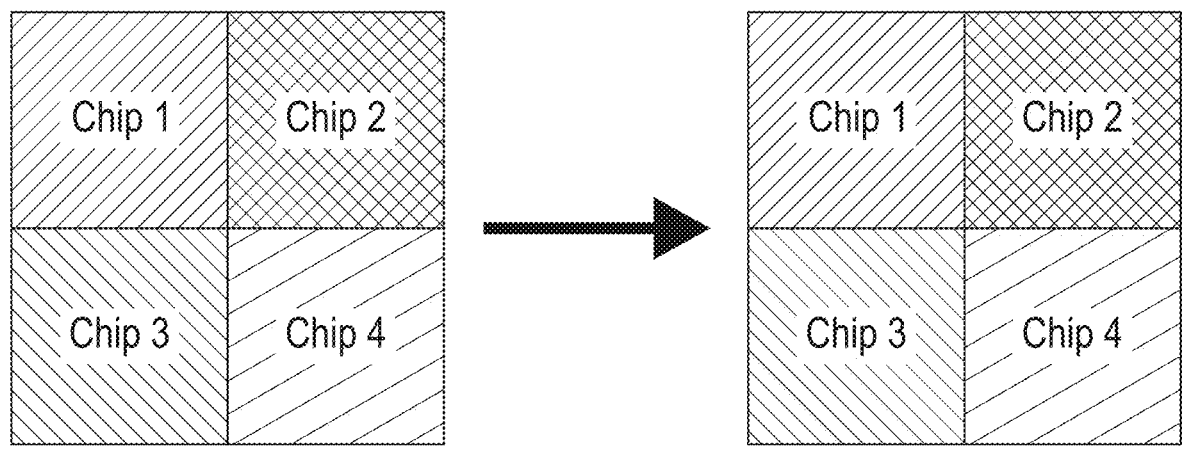

Referring now to FIGS. 11-13, mappings between input signal space and each individual neurosynaptic chip are illustrated when placement X, Y dimensions are set. In such cases, the mapping between the signal space and the input space is a linear mapping. Some mappings can be more efficient than others in terms of input and output bandwidth and placement solution.

Figure 14:
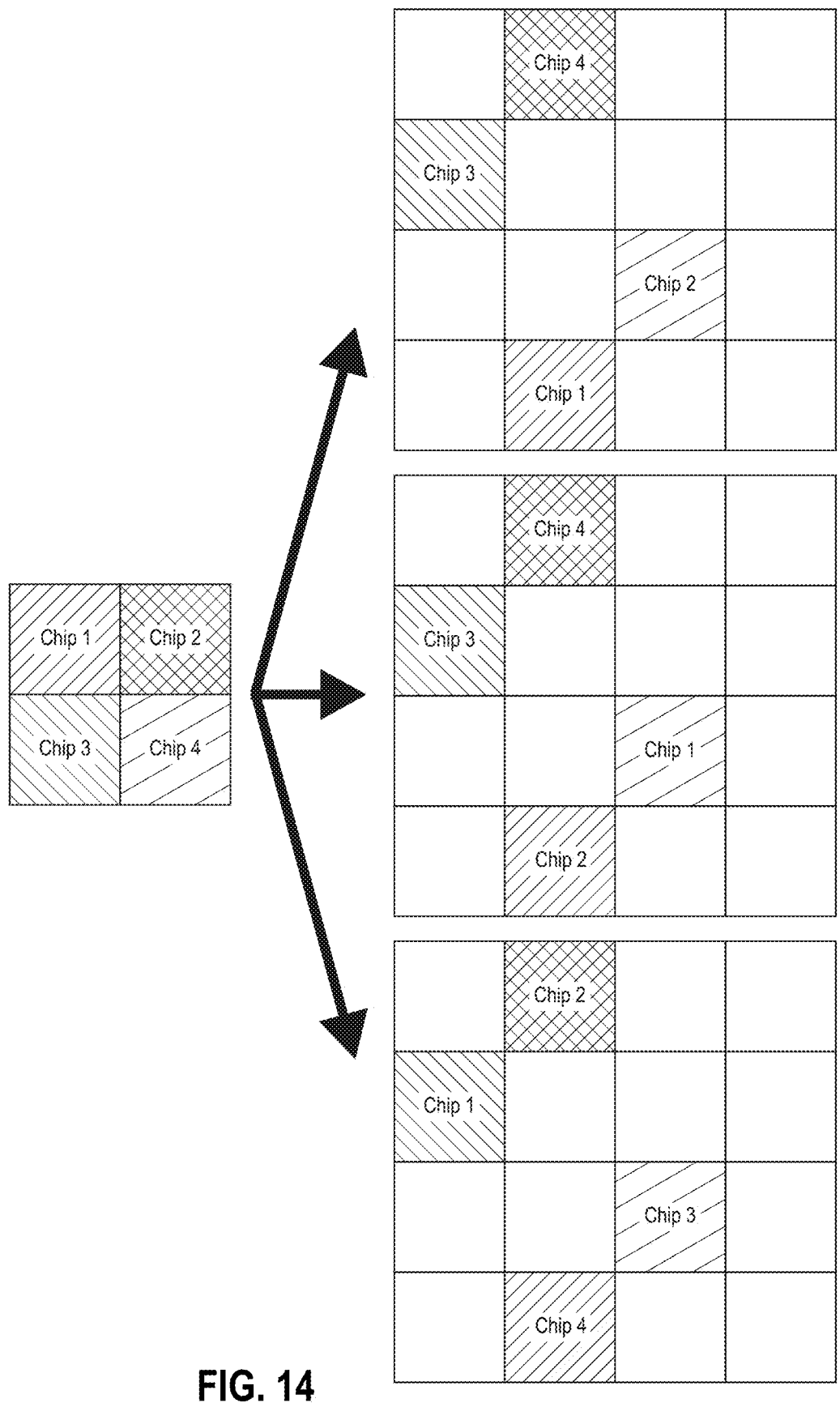

Referring to FIG. 14, a mapping between input signal space and each individual neurosynaptic chip is illustrated in a case where specific chips are designated for layout. Some mappings are more efficient than others in terms of input and output bandwidth and placement solution. In such cases, a user selects any four possible chips in the N×K chip neurosynaptic layout. In a simple system example, suppose we have a 4×4 neurosynaptic system as shown in FIG. 14. The user selects the marked chips as the desired chips that they want to layout the network on. There are different possible choices of chip ID assignment on each physical chip, as illustrated in the figure. The appropriate chip ID would determine the optimal mapping between the input signal space and the multi-chip neurosynaptic system. Placement processes according to the present disclosure resolve this mapping between the input signal space and the physical board space such that the sum of the inter-chip hop distances (Manhattan distance between all K choose 2 pairs of chips) is minimized. This would effectively guarantee that the overall inter-chip spike hop distance (the effective wire-length and the active power) is minimized.

Figure 15:
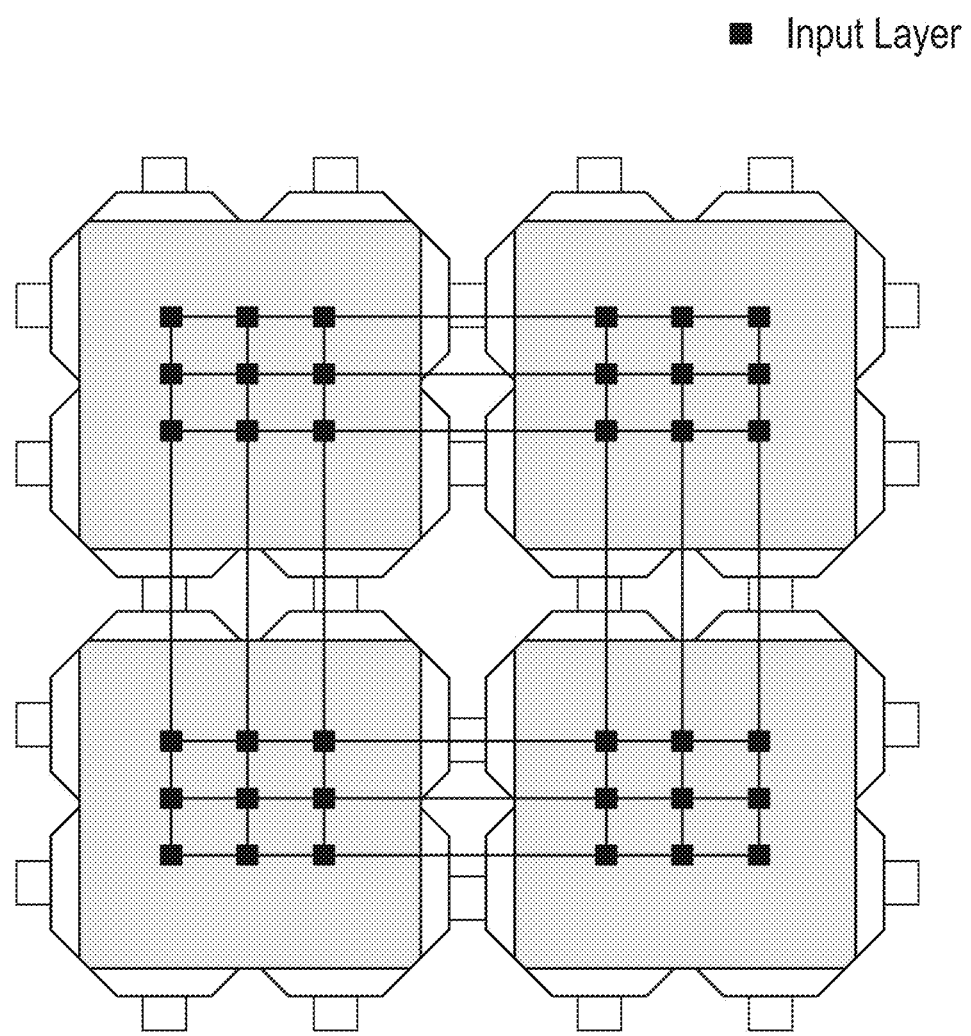
FIGS. 15-19 illustrate the iterative placement of cores of an exemplary layered neural network according to embodiments of the present disclosure.
Figure 16:
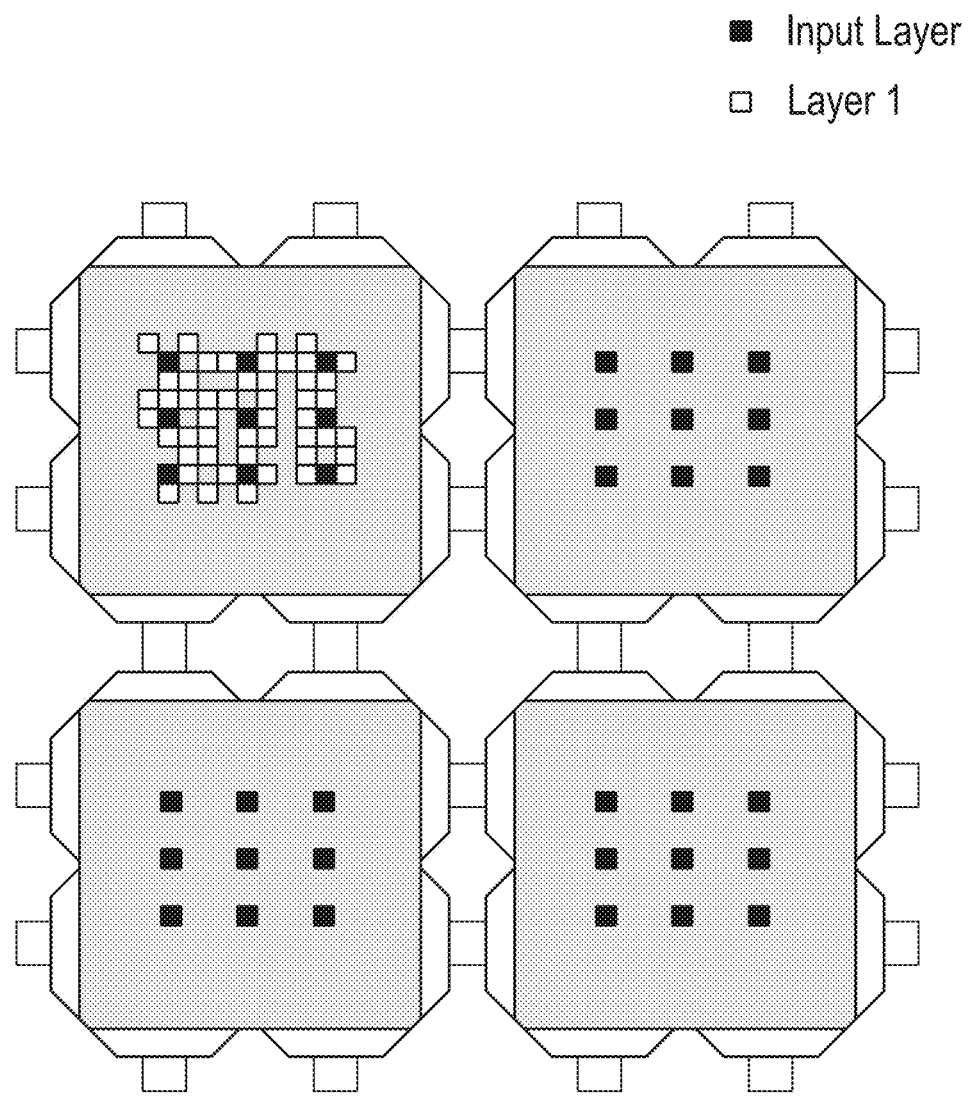
Figure 17:
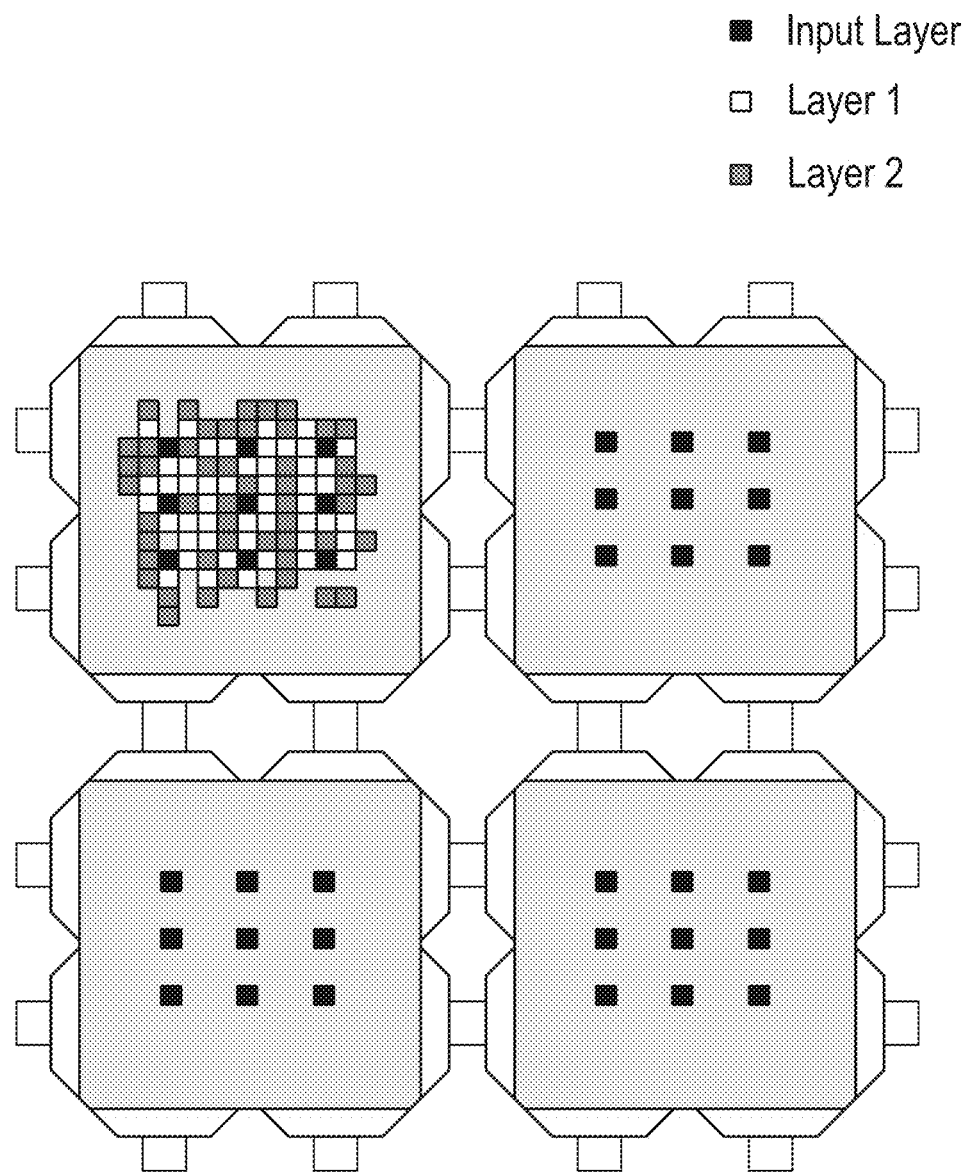
Figure 18:
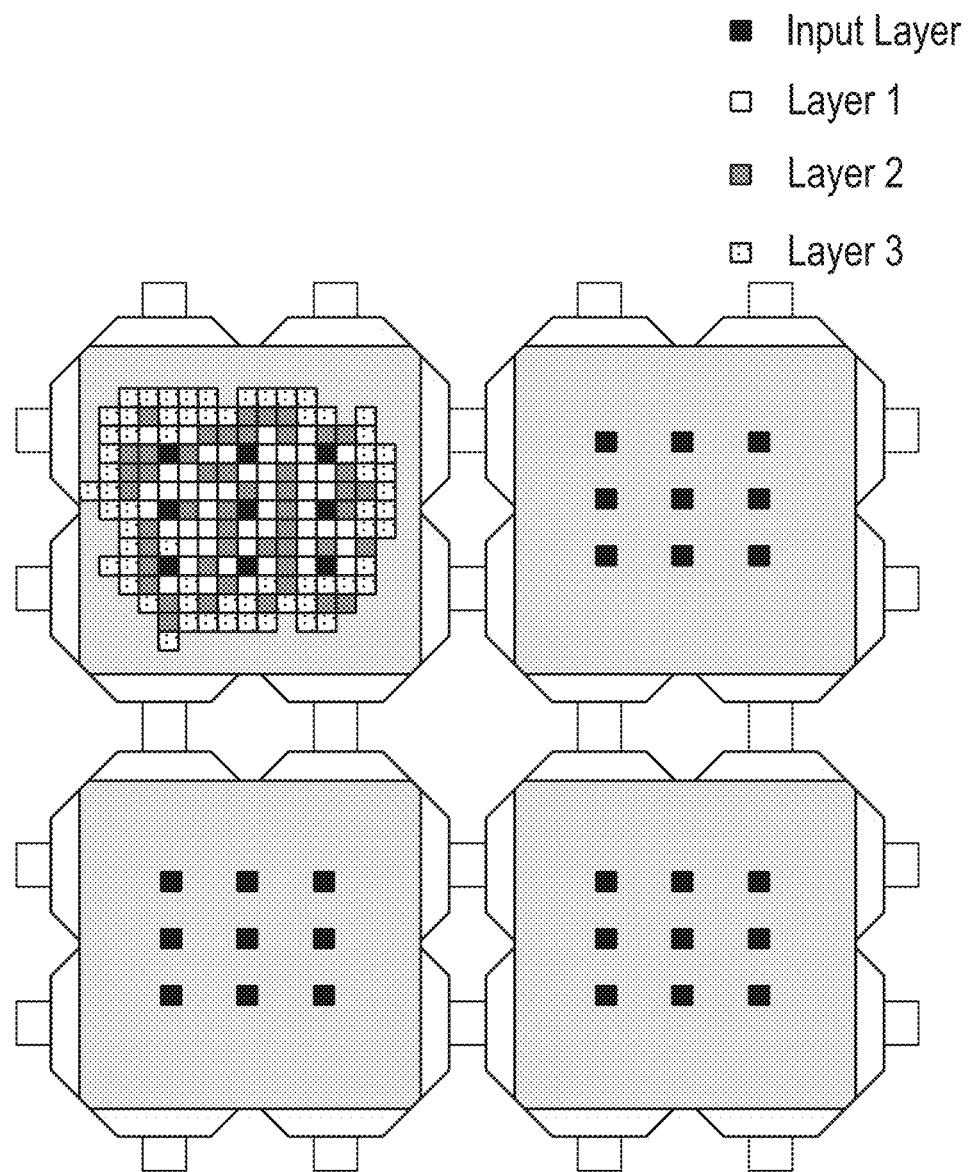
Figure 19:
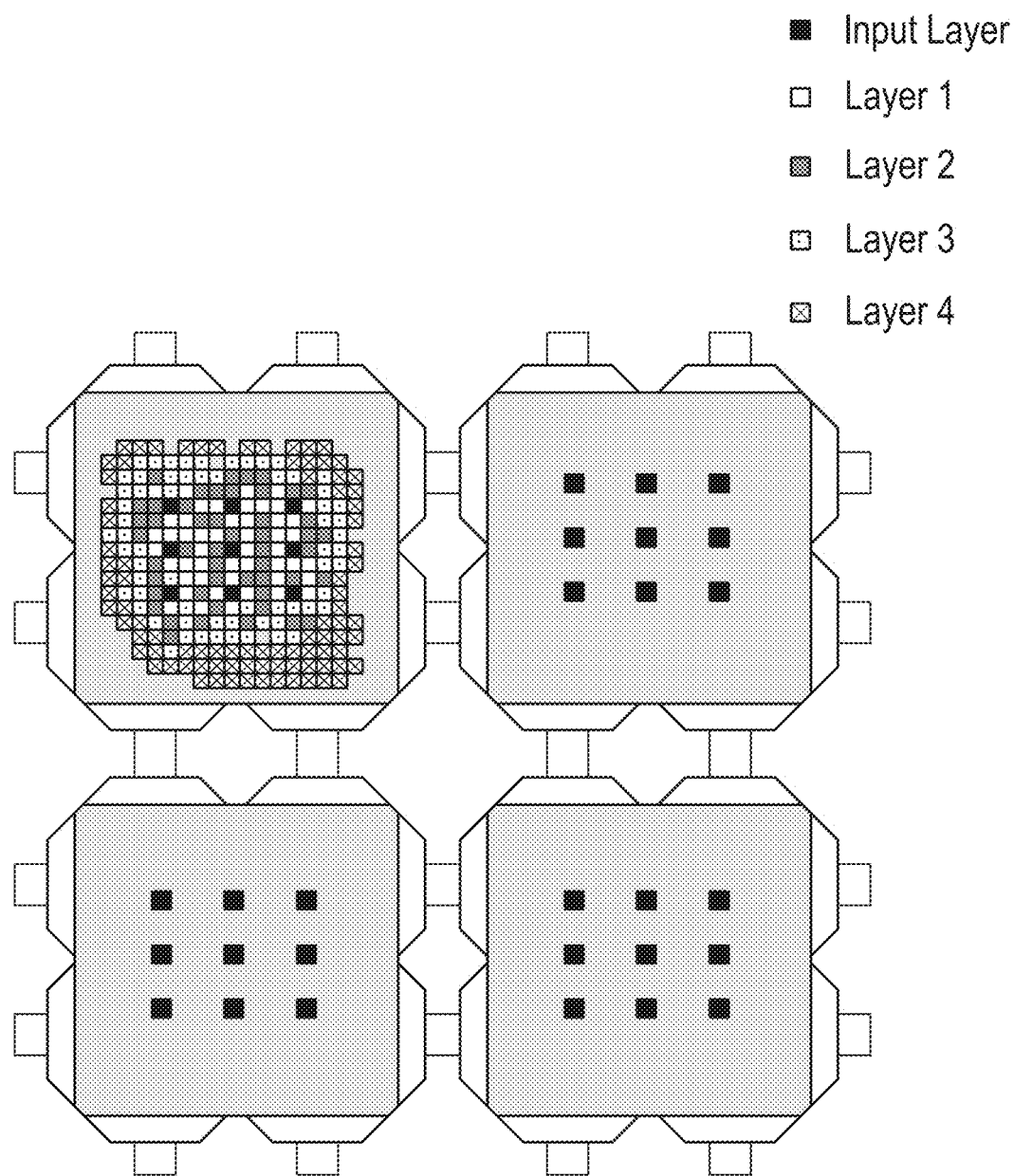

Referring now to FIGS. 15-19, the placement of cores of five layers of a network is illustrated. FIG. 15 corresponds to the placement of the input layer. FIG. 16 corresponds to the placement of a first layer (only shown for one chip for legibility). FIG. 17 corresponds to the placement of a second layer (only shown for one chip for legibility). FIG. 18 corresponds to the placement of a third layer (only shown for one chip for legibility). FIG. 19 corresponds to the placement of a fourth layer (only shown for one chip for legibility).

The placement algorithm generates K depth first graphs of nodes (neurosynaptic cores) originating from each of the input cores and stores them in memory, where K is the total number of neurosynaptic cores receiving external input spikes. The reverse graph of the network is also stored, providing the nodes (neurosynaptic cores) that are incident on a node (neurosynaptic core). In this example, it is assumed that the depth of the graph is D. These K nodes are partitioned into M partitions, where M is the number of neurosynaptic chips used for layout. Some partitions are more optimal than others, and the partitions depend on the configuration options configured by the user of a placement tool.

The core placement algorithm according to various embodiments iterates over each core $C_d^k$ where k denotes the $k^{th}$ depth-first graph and d represents the depth of the graph. In this case, $1 \leq k \leq K$ and $1 \leq d \leq D$. At every node (neurosynaptic core), the predecessor list of cores is read to determine where they are placed. The chip is selected from which maximum connections are drawn by the subject neurosynaptic core. An optimal grid location (X, Y) is found in that chip that minimizes the overall spike distance for all core-core communication. The details of the algorithm are illustrated by the figures in the following sections.

The algorithm clusters and collocates cores that process topographically neighboring regions of the input signal first. If there are M cores to be placed on each chip in the neurosynaptic system, then they are evenly laid out on the 64×64 grid space. If M is beyond a certain number, then the layout is evenly distributed, K cores in x dimension, 64 cores in y dimension. Else it can be laid out in K' cores in x dimension, 16 cores in y dimension. Cores are then iteratively placed in each consecutive network layer according to the overall path cost function. By appropriately penalizing cross-chip connections, highly connected cores are placed on the same chip. This technique effectively satisfies the objective of minimizing inter-chip communication and efficiently cuts the graph across multiple chips. Each layer-step of the algorithm is depicted in FIGS. 15-19.

Figure 20:
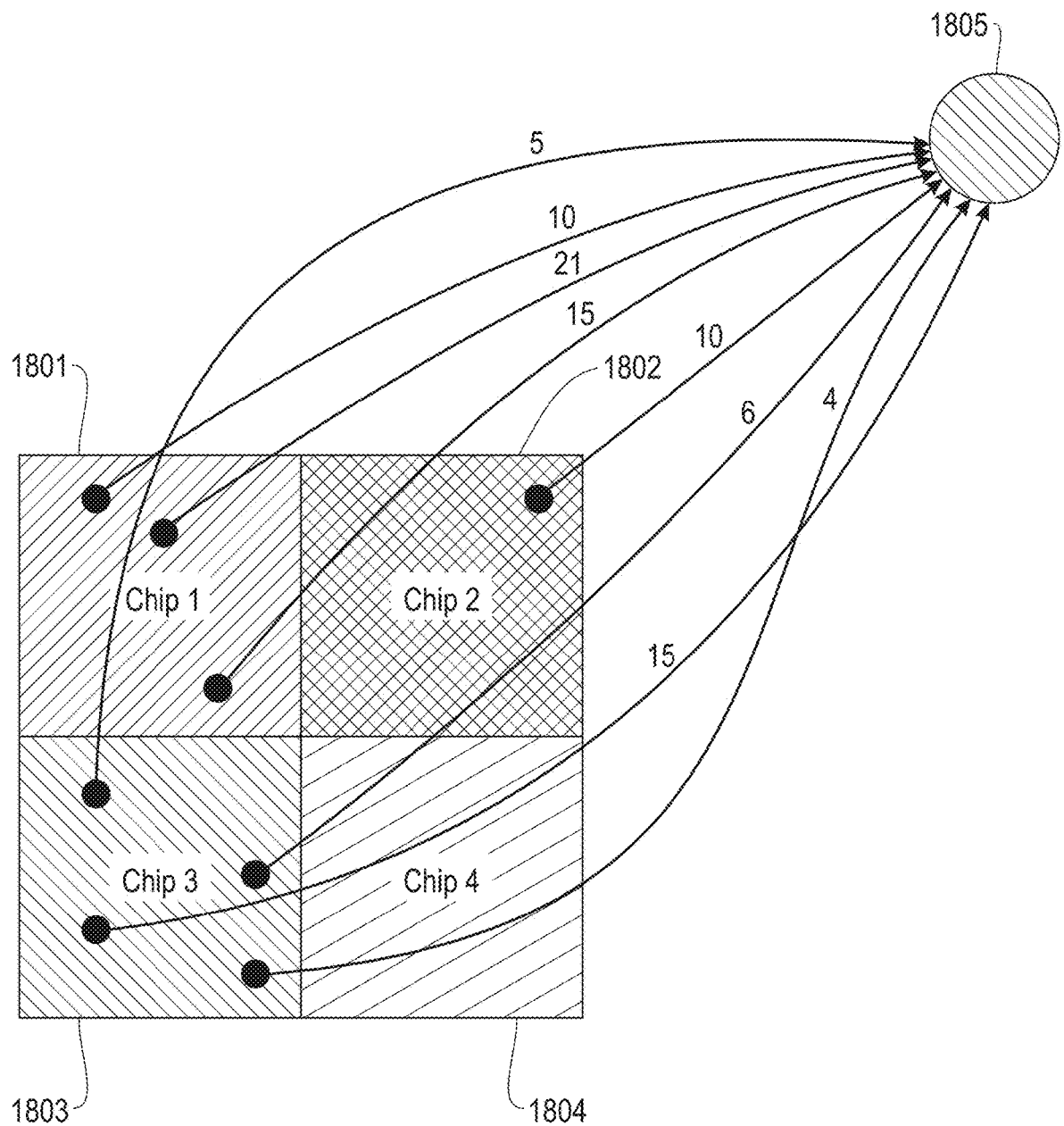
FIG. 20 illustrates a chip selection algorithm according to embodiments of the present disclosure.

Referring now to FIG. 20, a chip selection algorithm according to embodiment of the present disclosure is illustrated. For a given neurosynaptic core C, the weight contributions are computed from every other neurosynaptic core in the system which has already been placed on individual chips. The weights are then aggregated, and the chip from which maximal weight contributions are drawn from is selected. If any such predecessor neurosynaptic core C' has not been placed, then the same algorithm is repeated for all such cores C' first and then proceed to place C.

According to various embodiments, a physical location (x, y) is chosen on a chip C for allocation of a neurosynaptic core. For every location (c, x, y), for all chips in a multi-chip neurosynaptic system, the hop distance to all other physical locations (c, x', y') in that chip is precomputed. This precomputed Manhattan distance associated with each physical location (c, x', y') is then stored in a mapping table. In some embodiments, the table is sorted in an ascending order with respect to the hop distance. At any iteration of the placement algorithm, this mapping table is used for fast lookup and retrieval of a physical slot that would minimize the overall Manhattan distance between all neurosynaptic cores communicating with a target neurosynaptic core C. This is a greedy heuristic algorithm that attempts to minimize wire-length and hence active energy of the overall neurosynaptic system.

For a given neurosynaptic core C, the weight contribution is computed from every other neurosynaptic core in the system that has already been placed on to individual chips. The weights are aggregated and the chip is selected from which maximal weight contributions are drawn. If any such predecessor neurosynaptic core C' has not been placed, then the same algorithm is repeated for all such cores C' first and then proceed to place C.

With reference to FIG. 20, weight contributions for core 1805 are provided for each of four chips 1801 . . . 1804. Chip 1801 has a weight contribution of 10+21+15=46. Chip 1802 has a weight contribution of 10. Chip 1803 has weight contribution of 5+6+4+15=30. Chip 1804 has a weight contribution of 0. Accordingly, core 1805 will be placed on chip 1801.

Figure 21:
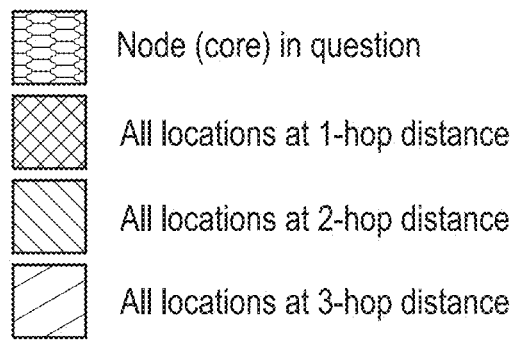
FIG. 21 illustrates an exemplary mapping table according to embodiments of the present disclosure.
Figure 21:
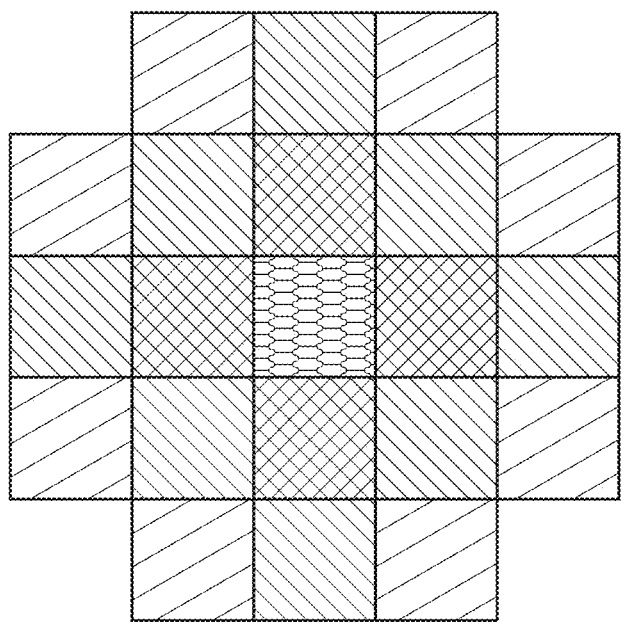

With reference now to FIG. 21, an exemplary mapping table is illustrated in which a subject core is at center. All locations at a single hop distance are located at cardinal directions from the subject core. Locations with additional hops form concentric regions around the subject core.

Figure 22:
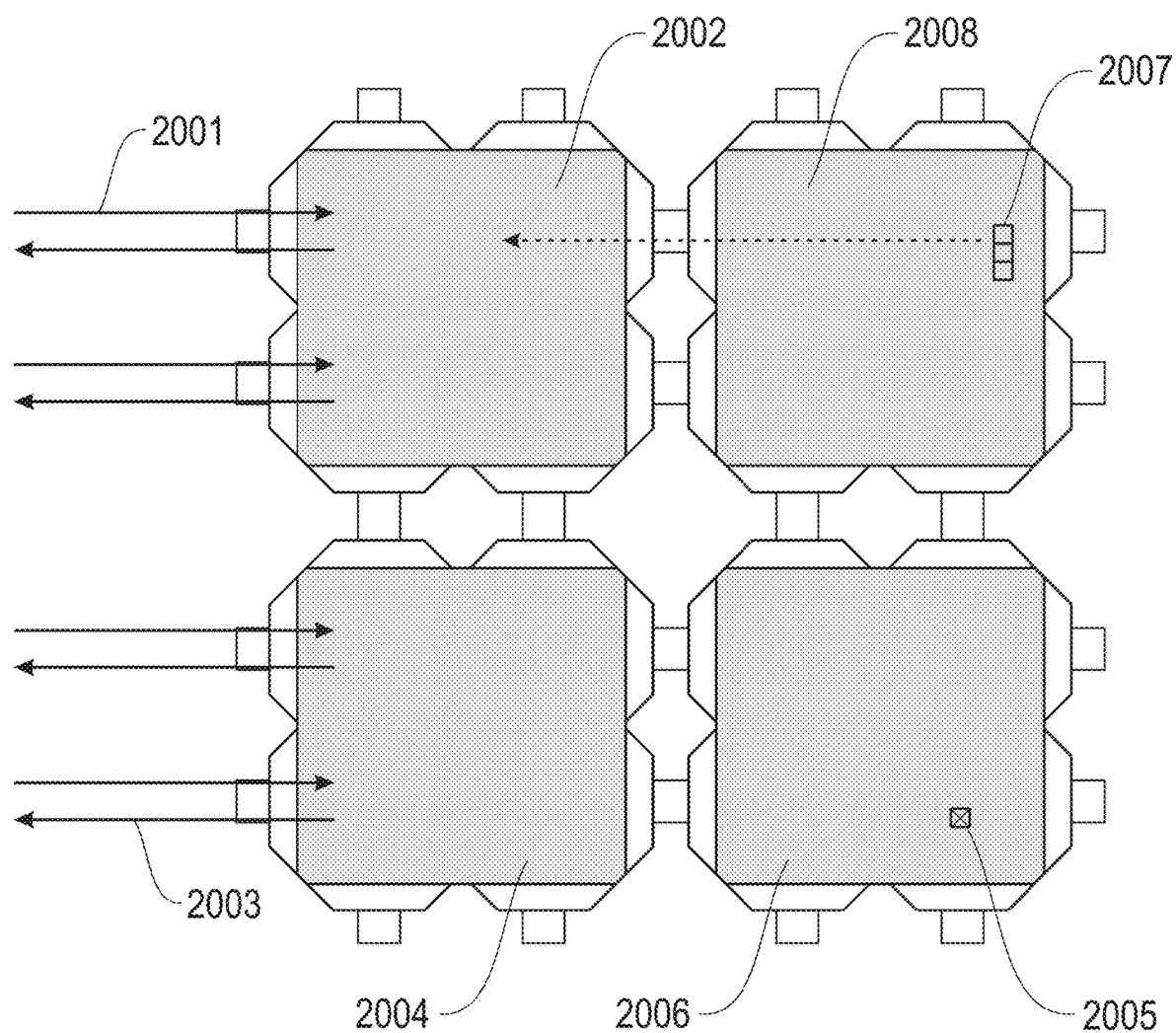
FIG. 22 illustrates the constraints on placement according to various embodiments of the present disclosure.

Referring to FIG. 22, the constraints on placement according to various embodiments are illustrated: Input bandwidth to a given chip (e.g., at input 2001 to chip 2002); Output bandwidth from a given chip (e.g., at output 2003 from chip 2004); Faulty cores (e.g., faulty core 2005 on chip 2006); and Output core locations (e.g., output cores 2007 on chip 2008). In various embodiments, placement algorithms satisfy the input bandwidth constraints across multiple ports in a multi-chip neurosynaptic system. In various embodiments, placement algorithms choose between different configurations of the chip layouts to meet this input bandwidth constraint. In various embodiments, placement algorithms satisfy the output bandwidth constraints across multiple ports in a multi-chip neurosynaptic system. In various embodiments, placement algorithms choose between different configurations of the chip layouts to meet this output bandwidth constraint. In various embodiments, placement algorithms satisfy the constraints of locations of some of the cores in the system. For example, in some embodiments of a multi-chip neurosynaptic system, the output cores cannot be placed along the last column in each chip. In various embodiments, placement algorithms satisfy any input constraint, which constraints the locations of specific cores on specific chips. In various embodiments, placement algorithms include fault-tolerance, laying out a network in the given chip configuration, by making sure that the faulty core locations are not used on each chip. If such a solution is infeasible, then it notifies the user.

Referring to Inset 1-Inset 6 below, an exemplary algorithm for core placement according to embodiments of the present disclosure is illustrated. Inset 1 indicates the starting condition. Inset 2 illustrates step A, in which neighbors are computed for all cores. Inset 3 illustrates step B, in which the input is partitioned across chips. Inset 4 illustrates step C, in which input cores are placed across chips. Inset 5 illustrates step D, in which a tree emanating from the input cores is created. Inset 6 illustrate step E, in which the tree is traversed layer by layer, placing cores to minimize cost.

---
Inset 1
---

Require: Graph G = (V, E) where v ∈ V & e ∈ E
   Input & Output Connectors
   K: number of chips to be mapped
   $v_I$: set of input cores
Ensure: Minimize wirelength
   Physical Location (chip, x, y) ← 0∀ faulty cores ---
Inset 2
---

Preprocessing Step:
Step A:
for v ∈ V do
   Compute out-degree of each v and store it in a list
   $v^{out}$ ← adjacent neighbors
   Compute in-degree of each v and store it in a list
   $v^{in}$ ← predecessor neighbors
end for ---
Inset 3
---

Step B: Given K chips and $v_I$ ∈ V
Create K clusters of vertices $v_i^k$ ∈ $v_I$ | ∀$v_i^k$ ∈ cluster $C_k$
each $v_i^k$ processes the $k^{th}$ topographic region in the input signal space.

Each cluster has approximately $\left\lfloor \frac{|v_I|}{K} \right\rfloor$ cores ---
Inset 4
---

Step C:
for ch ← 1 to K do
   for core c ∈ $\left\lfloor \frac{|v_I|}{K} \right\rfloor$ do
     Algorithmically Place c within the 64 × 64 grid ∀ch
   end for
end for ---
Inset 5
---

Step D:
for core c ∈ Input Connector do
   create depth-first $T_c$ tree originating from each core c
end for
Let $D_c$: depth of depth-first tree $T_c$ for core c
Let D = max($D_c$) denote max depth across all trees from each core c ---
Inset 6
---

Step E:
Let $c_i^d$ denote the $i^{th}$ core at depth d
for d ∈ D do
   for core $c_i^d$ ∈ V, | i ∈ I, d ∈ D do
     Create K weight bins $W_k$ for each core $c_i^d$
     for all cores c' ∈ $v^{in}$ do
        Look up in predecessor list $v^{in}$ where it is placed
        Add weight of edge e ∈ $v^{in}$ ⇔ $c_i^d$ in bin k
     end for
     Select chip CH ← k, for which $W_k^{max}$ = max($W_k$)
     $K_k$ ← $c_i^d$, where k ∈ (1, K)
     Compute physical ID (x, y) for $c_i^d$ | WLength$_{c_i^d}^{v_{in}}$ is minimized
     $c_i^d$ ← (CH, x, y)
     Availability of physical location (CH, x, y) ← 0
   end for
end for

---

In some embodiments, a placement system receives a plurality of input files. In various embodiments, these include a configuration file, an input device map file, a model file, a spike input file, an I/O connector file, or an input cores placement file. In some embodiments, the names of the configuration file, model file, and spike input spike file are passed in as command line parameters. In some embodiments, the names of the other files are provided in the configuration file.

In some embodiments, the configuration file contains parameters used for running on hardware such as TrueNorth. In some embodiments, it is generated by the make and run flow in CPE.

In some embodiments, the input device map file is the device specification that provides the input feature information. In some embodiments, it is a valid JSON formatted file. In some embodiments, the file name is provided as a field in the configuration file.

In some embodiments, the model file represents the spiking model that can be run on the simulator. In some embodiments, it is generated by the make and run flow in CPE.

In some embodiments, the optional spike input file has the main purpose of transferring spikes to and from the simulator or hardware such as TrueNorth, but here it is used to create a graph of dynamic core connectivity. It is not used to create a static graph of core connectivity.

In some embodiments, the I/O connector file is the collection of two files that are generated by CPE: the input connector file and output connector file. In some embodiments, the files names are provided as fields in the configuration file.

In some embodiments, the input cores placement file is a list of cores used as input to the placement. In some embodiments, it is a pre-placement file provided by an external system such as a DVS (dynamic vision sensor). In some embodiments, it is used for external sensory data.

After consuming the input files, placement systems according to the present disclosure such as NSCP create an internal representation of the network in the form of a graph. Each vertex of the graph is a neurosynaptic core. The edges of the graph are the number of connections between each pair of cores (in terms of the static number of connections) or the number of spikes between those two cores (representing dynamic activity in the network).

In some embodiments, the virtual graph is saved on disk in the form of nets, nodes, and weights files that are produced by the placement tool. These represent the virtual graph.

In some embodiments, the placement file is the principal output of the placement tool. It represents the placement solution, mapping a core identity to a physical identity on a two-dimensional grid of chips on a 4×4 NS16e board.

In some embodiments, the sub-graphs file describes all the sub-graphs originating from each individual input core. It is used for functional synthesis.

In some embodiments, the graph edge list file captures the entire connectivity of the graph of cores that can be used for visualization (e.g., using the networkx python package).

As noted above, placement systems according to the present disclosure can generate placement in two modes: Static Graph and Dynamic Graph. Systems according to the present disclosure create the internal graph of cores in memory from the model file and from the input and output connectors generated from CPE. This graph can either represent the connectivity between the cores (static connectivity) or the dynamic activity on the edges of the static graph, thus representing the dynamic graph. In various embodiments, this behavior may be configured at runtime.

In some embodiments, placement systems may be configured with respect to sensor input. In some embodiments that use an external sensory device, for example a DVS sensor, then the sensor may define a list of input cores on specific (X,Y) physical locations on the board (e.g., a NS16e board). In embodiments that do not use an external sensory device, then cores may be configured and placed on the board by importing several other design parameters. For example, if only K unique chips for the input cores are listed, systems according to the present disclosure will try to place all the cores in the network using those K chips.

Figure 23:
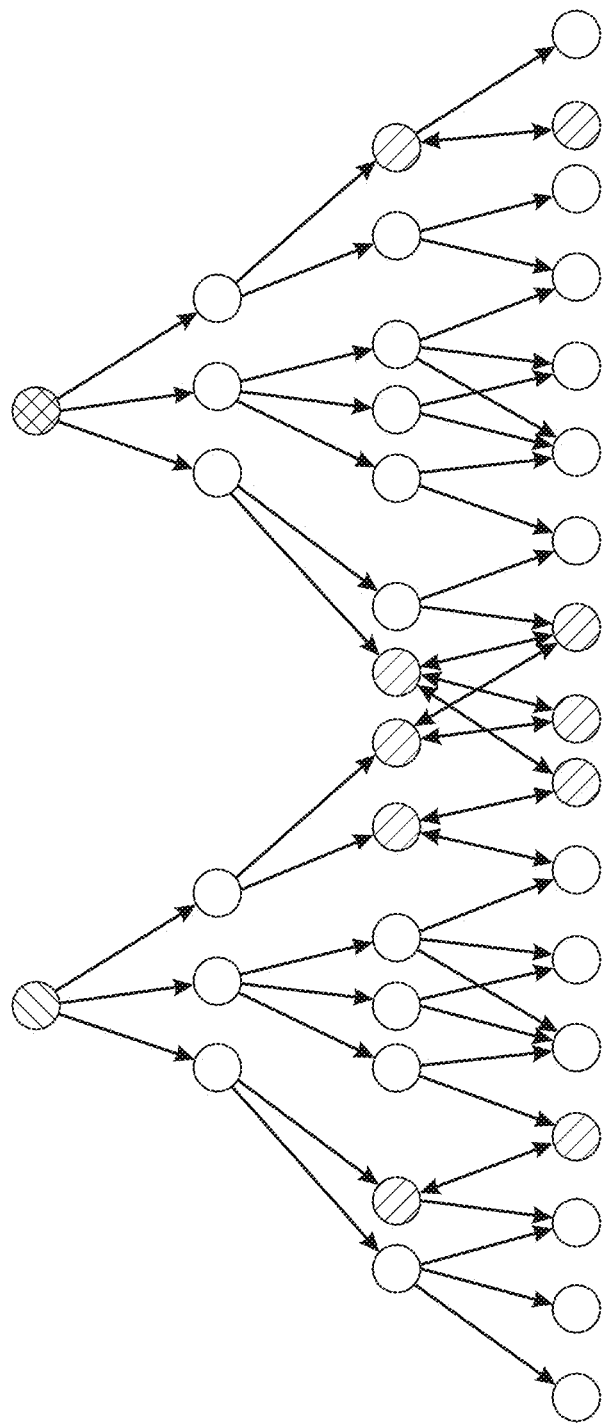
FIG. 23 illustrates two depth first trees originating from two neurosynaptic cores receiving input from outside an exemplary neurosynaptic system.

Although several of the examples herein are described in terms of purely feed-forward neural networks, it will be appreciated that the present disclosure is applicable to recurrent neural networks. Referring now to FIG. 23, two depth first trees originating from two neurosynaptic cores receiving input from outside the neurosynaptic system are illustrated. These trees include several common nodes. Some of the neurosynaptic cores have recurrent connections to other neurosynaptic cores. Neurosynaptic cores that connect to other neurosynaptic cores from which they directly receive input and cores that fall in the forward flow/path of a node (neurosynaptic core) to which they connect back to are highlighted.

The second case corresponds to recurrence that is beyond a single level, that is recurrence occurs because of connectivity from deeper in the network back to specific cores on specific layers. For both of these cases of recurrent structures, if the recurrence is within the sub-graph from which the forward flow of information happens, then this case can be solved using the same algorithm described above for feed-forward networks. This is because by the nature of the graph, these instances of recurrence are separable across multiple chips, and hence can be solved without any modifications of the algorithm.

In the more general case, some of the neurosynaptic cores may connect back to other neurosynaptic cores that are in two different sub-graphs originating from different input cores, placed on different chips.

Figure 24:
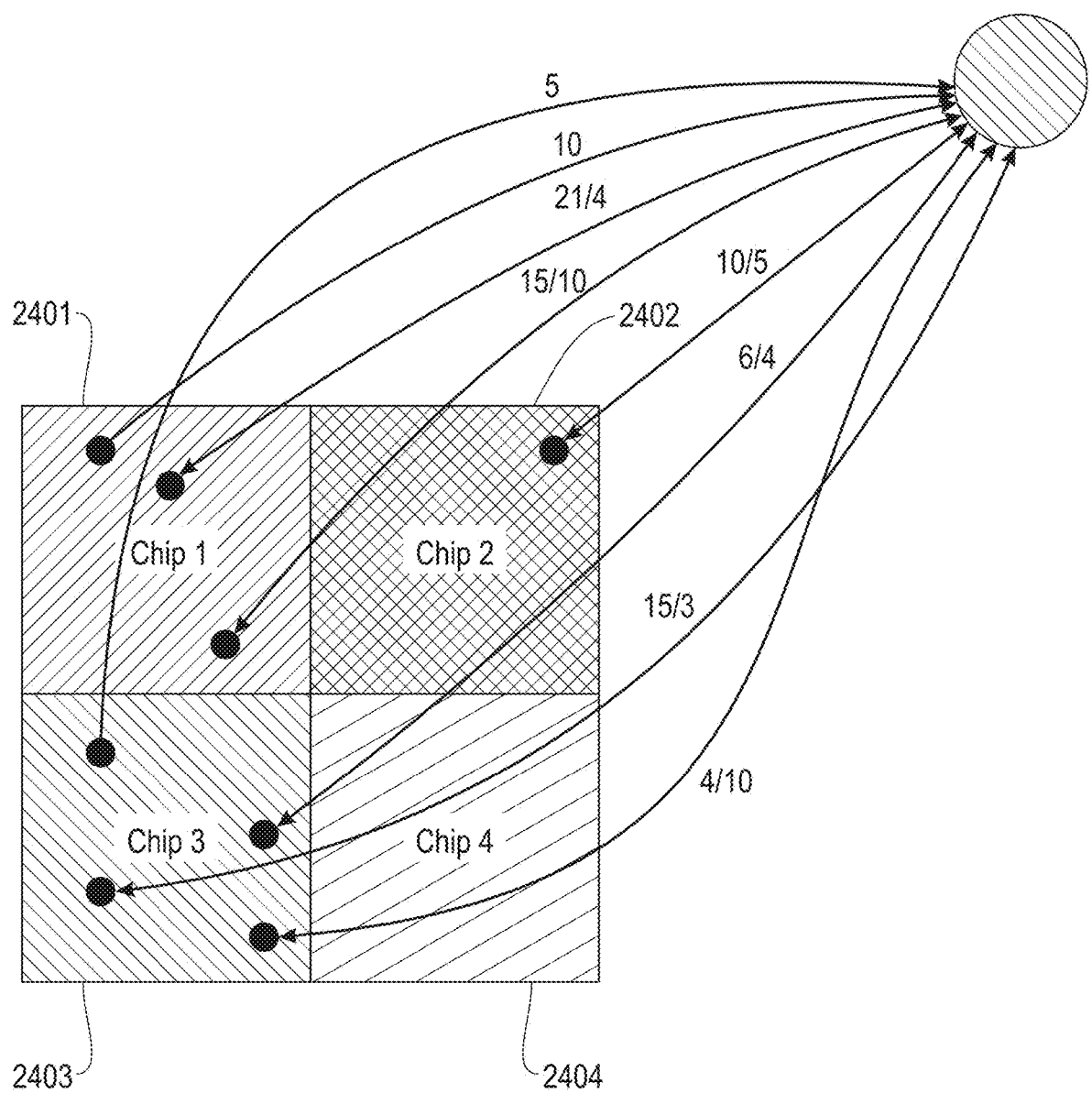
FIG. 24 illustrates two heuristics for the placement of cores with shared recurrence across multiple chips according to embodiments of the present disclosure.

Referring now to FIG. 24, two heuristics are illustrated for the placement of cores with shared recurrence across multiple flows/chips. Similar to the feed-forward networks, the weight contributions are computed in the forward direction. The weight contributions are also computed in the backward direction from the neurosynaptic core in question.

In this example, the chip 2401 has a forward weight contribution of 10+21+15=46 and a backward weight contribution of 10+4=14. Chip 2402 has a forward weight contribution of 10 and a backward weight contribution of 5. Chip 2403 has a forward weight contribution of 5+6+6+15=32 and a backward weight contribution of 4+10+3=17. Chip 2404 has a weight contribution of 0.

In some embodiments, the chip placement is determined by summing the weight contributions in both the forward and backward directions and then taking the maximum value element from that vector and using that to determine the target chip—max(sum(forward, backward)). In this example, the sum of the weight vectors is [60, 15, 50, 0] yielding placement on chip 2401.

In some embodiments, the chip placement is determined by independently selecting the chips appropriate for placement in the forward and backward flows and then selecting the chip corresponding to the maximum values between them—max(max(forward, backward)). In this case, the maximum forward weight belongs to chip 2401 (46) and the maximum backward weight belongs to chip 2403 (17). In this case, chip 2401 would again be selected for placement.

Figure 25:
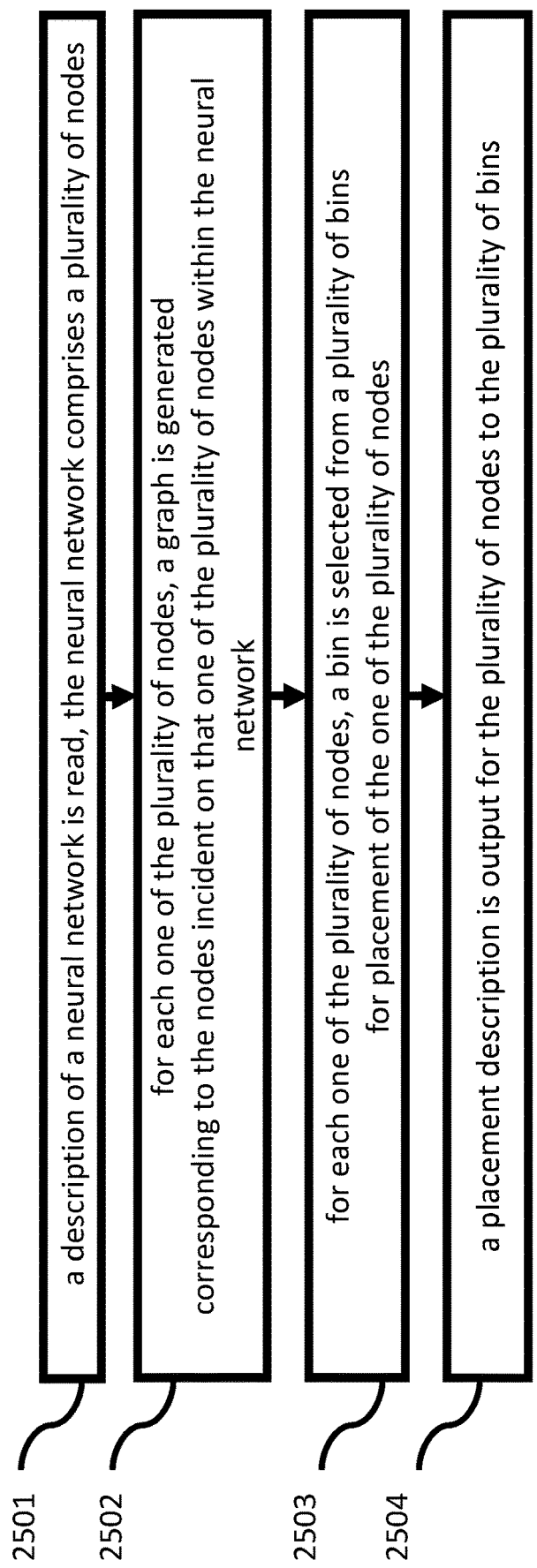
FIG. 25 illustrates a placement method according to various embodiments of the present disclosure.

Referring now to FIG. 25, a placement method according to various embodiments is illustrated. At 2501, a description of a neural network is read. The neural network comprises a plurality of nodes. At 2502, for each one of the plurality of nodes, a graph is generated corresponding to the nodes incident on that one of the plurality of nodes within the neural network. At 2503, for each one of the plurality of nodes, a bin is selected from a plurality of bins for placement of the one of the plurality of nodes. In some embodiments, the selection is based on the weight contribution from other nodes in that bin as indicated by the graph. At 2504, a placement description is output for the plurality of nodes to the plurality of bins.

It will be appreciated that although various examples according to the present disclosure are given in terms of core placement on chips, it will be appreciated that the present disclosure is also applicable to optimize the mapping of neurosynaptic cores onto multiple GPUs to minimize communication across GPUs. Likewise, the present disclosure is applicable to optimize mapping of neurosynaptic cores across multiple hosts in a distributed cluster setting (e.g., BlueGene™).

In some embodiments, a placement method further comprises uniformly partitioning topographic regions of an input signal space. In some such embodiments, the bin selection comprises allocating input nodes of the plurality of nodes according to the partitioning of the input signal space.

In some embodiments, the bin selection comprises allocating non-input nodes of the plurality of nodes according to weight contributions from other nodes in that bin as indicated by the graph.

In some embodiments, each of the plurality of nodes corresponds to a neurosynaptic core. In some embodiments, each of the plurality of bins corresponds to a neurosynaptic chip. In some embodiments, the neural network is a recurrent neural network.

In some embodiments, the weight contributions correspond to a number of connections between nodes. In some embodiments, the weight contributions corresponds to numbers of spikes between nodes. In some embodiments, the weight contributions include an incoming weight contribution and an outgoing weight contribution.

In some embodiments, each of the plurality of bins corresponds to a GPU. In some embodiments, each of the plurality of bins corresponds to a computing node.

In some embodiments, a placement method further comprises assigning the one of the plurality of nodes to a position within the selected bin.

In some embodiments, each of the plurality of nodes corresponds to a neurosynaptic core and each of the plurality of bins corresponds to a neurosynaptic chip. In some such embodiments, a placement method further comprises placing each of the neurosynaptic cores on one of the plurality of neurosynaptic chips according to the bin selection.

Figure 26:
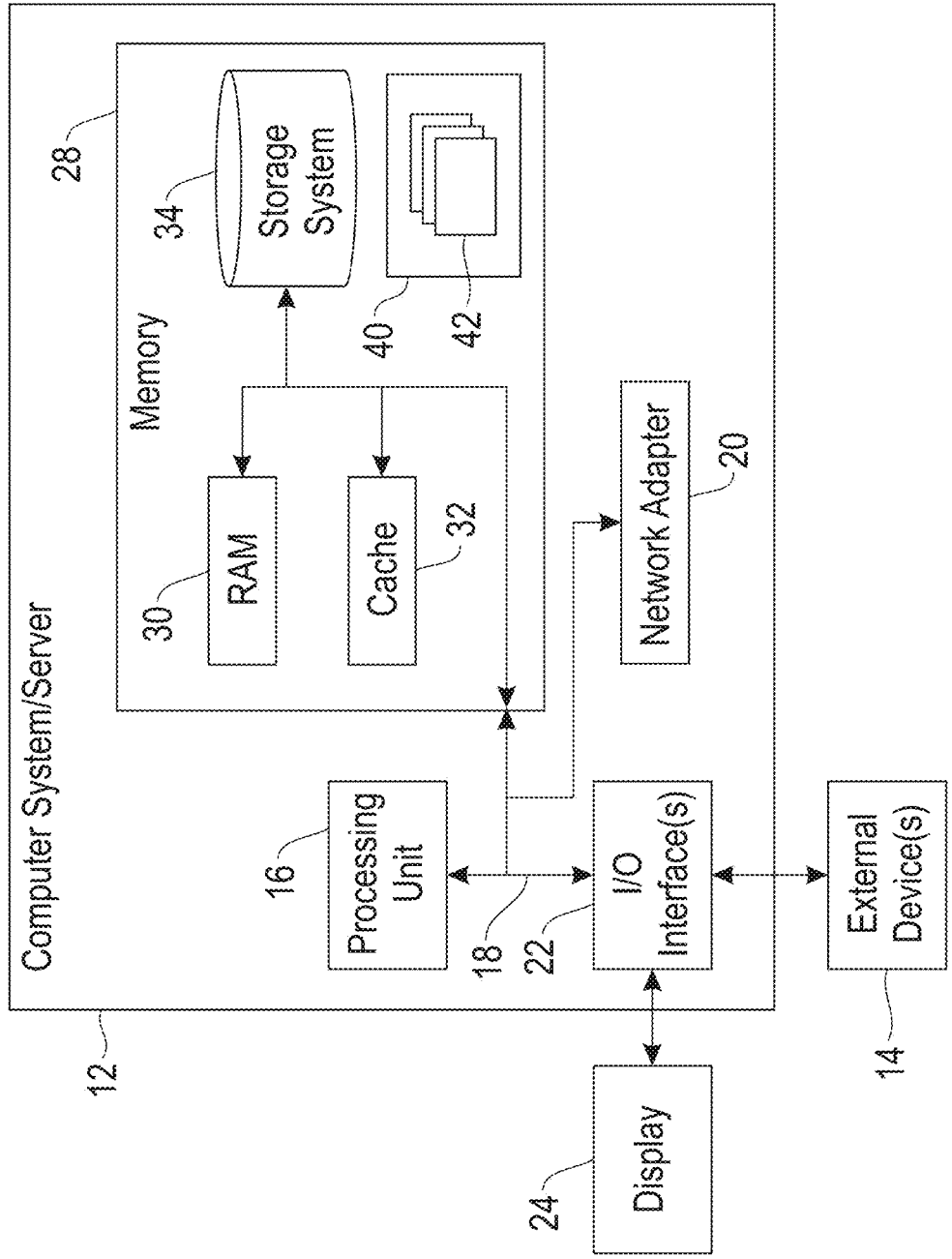
FIG. 26 depicts a computing node according to an embodiment of the present invention.

Referring now to FIG. 26, a schematic of an example of a computing node is shown. Computing node 10 is only one example of a suitable computing node and is not intended to suggest any limitation as to the scope of use or functionality of embodiments of the invention described herein. Regardless, computing node 10 is capable of being implemented and/or performing any of the functionality set forth hereinabove.

In computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 26, computer system/server 12 in computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computing node implemented method of efficient placement of nodes of a neural network on a plurality of neurosynaptic chips, the method comprising:
   reading a description of a neural network from a data store, the neural network comprising a plurality of nodes, wherein each node of the plurality of nodes corresponds to a neurosynaptic core;
   for each one of the plurality of nodes, generating, using a processor of the computing node, a graph corresponding to the nodes neighboring that one of the plurality of nodes within the neural network;
   for each one of the plurality of nodes, selecting, using the processor of the computing node, a bin of a plurality of bins for placement of the one of the plurality of nodes, the selection for non-input nodes being based on weight contributions from other nodes previously placed in that bin and as indicated by the graph, wherein the selection for non-input nodes comprises:
summing, for forward flows, forward weight contributions from nodes of each bin of the plurality of bins,
summing, for backward flows, backward weight contributions from nodes of each bin of the plurality of bins, and
selecting the bin that includes a maximum value among the summed forward weight contributions from the nodes of each bin of the plurality of bins and the summed backward weight contributions from the nodes of each bin of the plurality of bins;
outputting a chip placement description for the plurality of nodes to the plurality of bins according to said selecting the bin for each one of the plurality of nodes, wherein each bin of the plurality of bins represents a neurosynaptic chip;
placing each neurosynaptic core of the neurosynaptic cores on one of the plurality of neurosynaptic chips according to said selecting the bin for each one of the plurality of nodes; and
storing the chip placement description in a data store of the computing node.

2. The method of claim 1, further comprising:
uniformly partitioning topographic regions of an input signal space, and wherein
the bin selection comprises allocating input nodes of the plurality of nodes according to the partitioning of the input signal space.

3. The method of claim 1, wherein the neural network is a recurrent neural network.

4. The method of claim 1, wherein the weight contributions correspond to a number of connections between nodes.

5. The method of claim 1, wherein the weight contributions correspond to numbers of spikes between nodes.

6. The method of claim 1, wherein each bin of the plurality of bins is associated with a GPU.

7. The method of claim 1, further comprising:
assigning the one of the plurality of nodes to a position within the selected bin.

8. A system comprising:
a data store;
a computing node comprising a computer readable storage medium having program instructions embodied therewith, the program instructions executable by a processor of the computing node to cause the processor to perform a method comprising:
reading a description of a neural network from the data store, the neural network comprising a plurality of nodes, wherein each node of the plurality of nodes corresponds to a neurosynaptic core;
for each one of the plurality of nodes, generating a graph corresponding to the nodes neighboring that one of the plurality of nodes within the neural network;
for each one of the plurality of nodes, selecting a bin of a plurality of bins for placement of the one of the plurality of nodes, the selection for non-input nodes being based on weight contributions from other nodes previously placed in that bin and as indicated by the graph, wherein the selection for non-input nodes comprises:
summing, for forward flows, forward weight contributions from nodes of each bin of the plurality of bins,
summing, for backward flows, backward weight contributions from nodes of each bin of the plurality of bins, and
selecting the bin that includes a maximum value among the summed forward weight contributions from the nodes of each bin of the plurality of bins and the summed backward weight contributions from the nodes of each bin of the plurality of bins;
outputting a chip placement description for the plurality of nodes to the plurality of bins according to said selecting the bin for each one of the plurality of nodes, wherein each bin of the plurality of bins represents a neurosynaptic chip;
placing each neurosynaptic core of the neurosynaptic cores on one of the plurality of neurosynaptic chips according to said selecting the bin for each one of the plurality of nodes; and
storing the chip placement description in the data store.

9. The system of claim 8, the method further comprising:
uniformly partitioning topographic regions of an input signal space, and wherein
the bin selection comprises allocating input nodes of the plurality of nodes according to the partitioning of the input signal space.

10. A computer program product for neurosynaptic core placement, the computer program product comprising a computer readable storage medium having program instructions embodied therewith, the program instructions executable by a processor to cause the processor to perform a method comprising:
reading a description of a neural network from a data store, the neural network comprising a plurality of nodes;
for each one of the plurality of nodes, generating a graph corresponding to the nodes neighboring that one of the plurality of nodes within the neural network;
for each one of the plurality of nodes, selecting a bin of a plurality of bins for placement of the one of the plurality of nodes, the selection for non-input nodes being based on weight contributions from other nodes previously placed in that bin and as indicated by the graph, wherein the selection for non-input nodes comprises:
summing, for forward flows, forward weight contributions from nodes of each bin of the plurality of bins,
summing, for backward flows, backward weight contributions from nodes of each bin of the plurality of bins, and
selecting the bin that includes a maximum value among the summed forward weight contributions from the nodes of each bin of the plurality of bins and the summed backward weight contributions from the nodes of each bin of the plurality of bins;
outputting a chip placement description for the plurality of nodes to the plurality of bins according to said selecting the bin for each one of the plurality of nodes, wherein each bin of the plurality of bins represents a neurosynaptic chip
placing each neurosynaptic core of the neurosynaptic cores on one of the plurality of neurosynaptic chips according to said selecting the bin for each one of the plurality of nodes; and storing the chip placement description in a data store of the computing node.

11. The computer program product of claim 10, the method further comprising:
uniformly partitioning topographic regions of an input signal space, and wherein
the bin selection comprises allocating input nodes of the plurality of nodes according to the partitioning of the input signal space.

* * * * *